(12) United States Patent
Takatori et al.

(10) Patent No.: US 11,802,999 B2
(45) Date of Patent: Oct. 31, 2023

(54) LIGHT ABSORBING BODY, BOLOMETER, INFRARED RAY ABSORBING BODY, SOLAR THERMAL POWER GENERATING DEVICE, RADIANT COOLING FILM, AND METHOD FOR MANUFACTURING LIGHT ABSORBING BODY

(71) Applicant: RIKEN, Wako (JP)

(72) Inventors: Kentaro Takatori, Wako (JP); Takayuki Okamoto, Wako (JP)

(73) Assignee: RIKEN, Saitama (JP)

( * ) Notice: Subject to any disclaimer, the term of this patent is extended or adjusted under 35 U.S.C. 154(b) by 1053 days.

(21) Appl. No.: 16/329,134

(22) PCT Filed: Aug. 24, 2017

(86) PCT No.: PCT/JP2017/030403
§ 371 (c)(1),
(2) Date: Sep. 10, 2019

(87) PCT Pub. No.: WO2018/043298
PCT Pub. Date: Mar. 8, 2018

(65) Prior Publication Data
US 2019/0391301 A1   Dec. 26, 2019

(30) Foreign Application Priority Data

Aug. 31, 2016   (JP) ................. 2016-169692

(51) Int. Cl.
*G02B 5/00*   (2006.01)
(52) U.S. Cl.
CPC ..................... *G02B 5/003* (2013.01)
(58) Field of Classification Search
CPC ........ G02B 5/003; G02B 5/008; G02B 5/208; G02B 5/22; G02B 5/00; B82Y 20/00; B82Y 30/00; G01J 1/04
See application file for complete search history.

(56) References Cited

U.S. PATENT DOCUMENTS 5,403,435 A * 4/1995 Cathey ................... H01L 28/40
                                                         216/48
6,080,987 A * 6/2000 Belcher ..................... G01J 5/08
                                                         257/E27.137
(Continued)

FOREIGN PATENT DOCUMENTS

JP    2012-14976 A    1/2012
JP    2012-164980 A   8/2012
(Continued)

OTHER PUBLICATIONS

Examiner provided machine translation of Katano et al. (JP 2015010825 A) (Year: 2015).*
(Continued)

*Primary Examiner* — Balram T Parbadia
(74) *Attorney, Agent, or Firm* — Seed IP Law Group LLP

(57) ABSTRACT

In order to realize a light absorber wherein the wavelengths absorbed can be adjusted, an embodiment of the present invention provides a light absorber 100 provided with a group of dielectric protrusions 102, a conductive thin film 104, and a conductive thick film 108. The group of dielectric protrusions has each dielectric protrusion protruding at a random position on a dielectric surface. A dielectric thin film is disposed on or above at least part of the surface of the dielectric protrusions and on or above at least part of the dielectric surface where the dielectric protrusions are not present; and the dielectric thick film spreads out along the dielectric surface and being kept separate from the dielectric thin film. The group of dielectric protrusions can be provided by disposition of dielectric particles in an in-plane random arrangement on the surface. The present invention also provides a bolometer, an infrared light absorber, a solar thermal power generating device, and a radiative cooling (Continued)

film adopting the light absorber above as well as a method for manufacturing the light absorber.

17 Claims, 19 Drawing Sheets

(56) References Cited

U.S. PATENT DOCUMENTS

| | | | |
|---|---|---|---|
| 9,537,025 B1 * | 1/2017 | Kayes | H01L 31/0735 |
| 2009/0014056 A1 * | 1/2009 | Hockaday | H01L 31/035281 |
| | | | 136/246 |
| 2009/0316262 A1 * | 12/2009 | Kittaka | G02B 5/3041 |
| | | | 359/485.01 |
| 2011/0309382 A1 * | 12/2011 | Lowgren | H01L 33/08 |
| | | | 257/E33.072 |
| 2012/0279549 A1 * | 11/2012 | Urien | H10K 39/10 |
| | | | 257/E51.012 |
| 2013/0294729 A1 | 11/2013 | Layton et al. | |
| 2014/0117401 A1 * | 5/2014 | Herner | H01L 33/62 |
| | | | 438/42 |
| 2014/0154668 A1 * | 6/2014 | Chou | G01N 21/6486 |
| | | | 435/7.1 |
| 2015/0036234 A1 | 2/2015 | Ben-Yakar et al. | |
| 2015/0062686 A1 | 3/2015 | Smith et al. | |
| 2015/0333201 A1 | 11/2015 | Sargent et al. | |
| 2016/0003744 A1 * | 1/2016 | Chou | G01N 21/6486 |
| | | | 435/7.1 |
| 2016/0282522 A1 * | 9/2016 | Schiavoni | C23C 14/0652 |
| 2018/0238739 A1 * | 8/2018 | Poutous | G01J 5/12 |

FOREIGN PATENT DOCUMENTS

| | | |
|---|---|---|
| JP | 2015-10825 A | 1/2015 |
| JP | 2015-121417 A | 7/2015 |
| WO | 2015/011009 A1 | 1/2015 |

OTHER PUBLICATIONS

Aydin et al., "Broadband polarization-independent resonant light absorption using ultrathin plasmonic super absorbers," *Nature Communication* 2(517), 2011. (7 pages).

Hedayati et al., "Design of a Perfect Black Absorber at Visible Frequencies Using Plasmonic Metamaterials," *Advanced Materials* 23(45), 2011. (14 pages).

Ng et al., "Hot Carrier Extraction with Plasmonic Broadband Absorbers," *ACS Nano* 10(4), 2016. (17 pages).

Shun Cao et al.; "Hierarchic random nanosphere model for broadband solar energy absorbers"; Optical Society of America ; Nov. 5, 2015; vol. 5, No. 12, 9 Pages.

Supplementary European Search Report for EP Application No. 17846303; dated Apr. 17, 2020; 2 pages.

Takei et al.; "Absorption spectrum of surface-bound cap-shaped gold particles"; Optics Letters; Mar. 1, 2002, vol. 27, No. 5, pp. 342-344.

* cited by examiner

LIGHT ABSORBING BODY, BOLOMETER, INFRARED RAY ABSORBING BODY, SOLAR THERMAL POWER GENERATING DEVICE, RADIANT COOLING FILM, AND METHOD FOR MANUFACTURING LIGHT ABSORBING BODY

TECHNICAL FIELD

The present invention relates to a light absorbing body, a bolometer, and an infrared absorbing body, a solar thermal power generating device, a radiant cooling film, and a method for manufacturing the light absorbing body. More specifically, the present invention relates to a light absorber, a bolometer, an infrared absorber, a solar thermal power generating device, a radiative cooling film utilizing surface plasmons, and a method for manufacturing the light absorber.

BACKGROUND ART

Absorption has been utilized for various purposes with respect to an electromagnetic wave in a wavelength region that has been treated in the field of optics, including visible light or infrared light (hereinafter referred to as "light" or "light wave"). Design of an object having absorption capability of light ("light absorber") with good light absorption characteristics in a wide wavelength range, or one with an adjusted absorbance value for each wavelength, can be applied to a wide variety of applications and therefore is extremely useful. For a thermal type detection device such as a bolometer, there is a need for a light absorber in place of an absorbent material such as a gold-black adopted currently. In solar cells, if light in a wide wavelength range of sunlight, ranging from 300 nm to 2500 nm, can be absorbed by an active layer, significant improvement in performance can be expected. If the solar radiation can be efficiently absorbed, it can also be used for solar thermal power generation utilizing the heat. Furthermore, a technique capable of appropriately controlling the absorption wavelength range has been desired in another application. The heat ray absorbing glass for absorbing sunlight in the infrared region can have a light transmission function and a heat ray shielding function at the same time. It is possible to save energy for cooling while having ordinary glass functions such as visible light transmittance. An absorber with good absorption in a wavelength range that serve as an atmospheric window is also useful as a radiator of a radiative cooling device for efficiently emitting heat energy to outer space, from Kirchhoff's law in which the absorptance and the emissivity coincide with each other. Thus, a wide variety of applications can be expected if excellent absorption characteristics can be realized in a wide wavelength range, or if the wavelength range can be artificially adjusted.

Typical light absorbers include pigments or dyes, where the light of a specific wavelength is absorbed based on a difference between the energy levels of electrons or the vibrational energy levels of the bonds. Thus, for realizing a desired absorption wavelength range, it is necessary to design a material that exhibits absorption in a wavelength range, which depends upon the chemical structure. It is often difficult to design in pigments and dyes such that the absorption enhanced in a wavelength range while suppressing it in another wavelength range so as to be transparent, for example. Furthermore, the pigments and the dyes may cause problems in durability in long-term use.

In contrast, when it comes to absorption caused by surface plasmon resonance, related range can be adjusted by designing a structure that supports surface plasmons, and high durability can be expected. These properties are important for applications. For example, improvement in efficiency can be expected in power generation if absorption by surface plasmons is adopted for organic solar cells (plasmonic solar cells), as a wide wavelength range are utilized. When a plasmonic electrode having a plasmonic structure for supporting surface plasmons is used in solar cells in place of a transparent electrode, for which ITO is usually adopted, the light absorption will be enhanced by surface plasmon resonances there, and the photoelectric conversion efficiency will also be improved. Moreover, when an appropriate electrode structure is used, the enhanced light absorption will hardly show the incident angle dependency and polarization dependency.

Various proposals have been made for light absorption by surface plasmon resonances on the basis of these points. For example, Non-Patent Document 1 (K. Aydin et al., Nat. Commun. 2, 517 (2011)) discloses a light absorber having a structure of a metal-dielectric-metal (MIM) having a transparent dielectric sandwiched between a silver thin film having a periodically perforated holes with distorted apertures and a flat thick silver film. Non-Patent Document 2 (M. K. Hedayati et al., Adv. Mater. 23, 5410 (2011)) discloses a light absorber having an MIM structure where a transparent dielectric is sandwiched between a layer in which gold nanoparticles are mixed in silica and a flat thick gold film. Non-Patent Document 3 (C. Ng et al., ACS Nano 10, 4704 (2016)) discloses an MIM structure where a transparent dielectric is sandwiched between a layer formed by aggregation of gold nanoparticles and a flat thick gold film.

CITATION LIST

Non-Patent Documents

Non-Patent Document 1: K. Aydin et al., "Broadband polarization-independent resonant light absorption using ultrathin plasmonic super absorbers", Nat. Commun. 2, 517 (2011), doi: 10.1038/ncomms1528

Non-Patent Document 2: K. Hedayati et al., "Design of a Perfect Black Absorber at Visible Frequencies Using Plasmonic Metamaterials", Adv. Mater. 23 (45), pp 5410-5414 (2011), doi: 10.1002/adma.201102646

Non-Patent Document 3: C. Ng et al., "Hot Carrier Extraction with Plasmonic Broadband Absorbers", ACS Nano, 2016, 10 (4), pp 4704-4711, doi: 10.1021/acsnano.6b01108

SUMMARY OF DISCLOSURE

Technical Problem

A conventional light absorber utilizing surface plasmon resonances generally exhibits the absorption bandwidth of about 100 nm to 500 nm, whose bandwidth is insufficient for applications that require improved efficiency in light absorption for the device efficiency, or that require reliable absorption of light waves in a wide wavelength range. Although a technique with enhanced light absorption has been disclosed in recent years, a bandwidth exhibiting absorption is limited to the entire visible region, or a range in which a small near-infrared region is added to the visible region, which still exhibits insufficient absorption. For example, the light absorber with a metal-dielectric-metal (MIM) structure in Non-Patent Document 1 exhibits absorption bandwidths at 400-750 nm only. Non-Patent Document 2 discloses a light absorber with an MIM structure. Its absorption is very high in the visible region, but 50% or at 1000 nm. Non-Patent Document 3 discloses a light absorber of a MIM structure using the particles. Based on the absorption for 350 nm to 1300 nm indicated therein, the absorption ratio in the near-infrared region is 10% or less at 1300 nm.

The present invention is to provide a light absorber with good absorption characteristics and to facilitate technical development of the light absorber, thereby it contributes the improvement of performance in a variety of products that adopt light absorption as an operational principle.

Solution to Problem

For the improvement in the absorption performance based on the MIM structure described above, the inventors paid attention to unique dispersion curves of surface plasmons exhibited in an MIM structure. Then, we note that a high absorption and an artificially tailoring capability of the bandwidth can be achieved at a time by adopting an improved fine structure in the MIM structure for generating diffraction, thereby the present invention has been accomplished.

Therefore, provided in one aspect of the present disclosure is a light absorber, comprising: a group of dielectric protrusions, each dielectric protrusion protruding from a dielectric surface at a random position on the dielectric surface; a conductive thin film disposed on or above at least a part of a surface of each dielectric protrusion in the group and on or above at least a part of the dielectric surface where dielectric protrusions are not present; and a conductive thick film spreading out along the dielectric surface and being kept separate from the conductive thin film.

In such a light absorber, the dielectric protrusion means a shape whose surface profile shows at least a certain degree of protrusion. The dielectric protrusions can be produced by a variety of techniques, and they can be formed by imprinting technique that duplicate some shape by molding (for example, nanoimprinting), or by using self-organization or phase separation. For at least a part of the surface of the dielectric protrusion and a part where the dielectric protrusions are not present on the dielectric surface, a conductive thin film is disposed directly in contact with or via some spacing material or a spacing layer. The conductive thin film is a film of a substance exhibiting at least some conductivity in a frequency region. Such conductivity may be described herein by expressions with metallic behavior. Also, a thin film and a thick film for the conductive thin film and the conductive thick film of the present invention are distinguished from each other, from a view point of energy transmission of light, including energy transmission by the surface plasmons excited by the light. The term thin film is used when at least a portion of light energy transmission property is utilized even in the slightest degree, and the term thick film is use when the transmitted light is not used at all. Therefore, the thick film does not mean a bulk material, the thickness of the conductive thick film may be thinner than that of the conductive thin film. Therefore, the thin film and thick film in the present application are the terms for distinguishing based only on optical transmission capability.

The present invention can also be implemented by a method for manufacturing a light absorber. That is, provided in another aspect of the present disclosure is a method for manufacturing a light absorber, comprising steps of: forming a group of dielectric protrusions, each of which protruding from a dielectric surface at a random position on the dielectric surface; disposing a conductive thin film on or above at least a part of a surface of each dielectric protrusion in the group and on or above at least a part of the dielectric surface where the dielectric protrusions are not present; and forming a conductive thick film that spreads out along the dielectric surface and is kept separate from the conductive thin film.

In the present application, light or a light wave generally refers to an electromagnetic wave in a wavelength range that is treated in an optical field, to be more specific, ultraviolet, visible, near-infrared, middle-infrared, and terahertz regions. In addition, the term random indicates that the arrangement is disturbed the regularity is broken even in the slightest degree.

Advantageous Effects of Disclosure

In any of the aspects of the present invention, it is possible to provide an absorber in which the absorption bandwidth is increased, with adjusting capability of a wavelength range, and having a small incident angle dependency.

DESCRIPTION OF EMBODIMENTS

Figure 1:
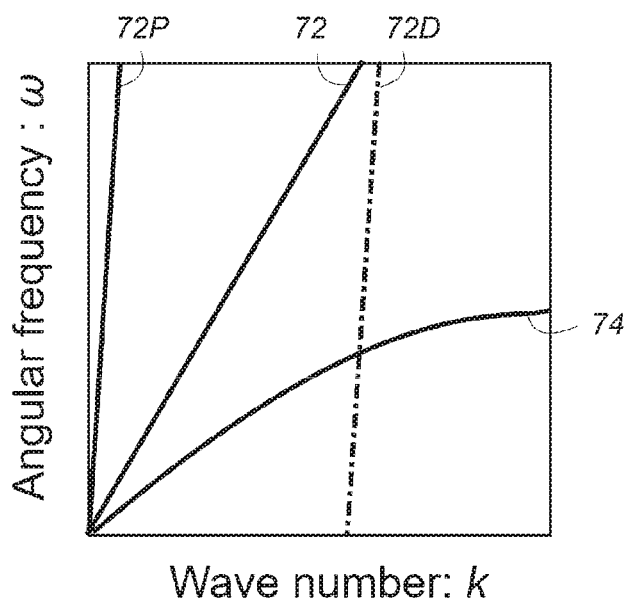
FIG. 1 is an explanatory diagram indicating a dispersion relation between surface plasmons and light waves on a flat metal surface in a graph.

Hereinafter, embodiments related to a light absorber according to the present disclosure will be described with reference to the drawings. In the description, common parts or elements throughout the drawings are denoted by the same reference numerals, unless otherwise noted. Each element in the drawings should be understood as not being drawn to scale. In addition, a numerical range indicated by two or more values connected by "-" should be construed to include both end values inclusively, unless otherwise noted.

A high absorption in a wide wavelength range can be achieved for a suitably designed light absorber implemented in this embodiment, unlike conventional absorption in a wavelength range of the visible region and a near-infrared region close to the visible. For example, it will be able to obtain an absorption band ranging from 400 nm to 5000 nm when the design is carried out for expanding the wavelength range. When the material is suitably selected on top of that, it will be easy to manipulate the absorption band artificially to obtain sufficient absorption in the infrared region with sufficient transmittance in visible range, as an example. Furthermore, the absorption characteristics of the light absorber of this embodiment also will exhibit less dependency on the incident angle. In this embodiment, the principle of an absorber having such a high capability and its design concept will be described, and further, samples of the light absorber in which the principle is actually confirmed will be described.

1. Principles and Concepts

Figure 2:
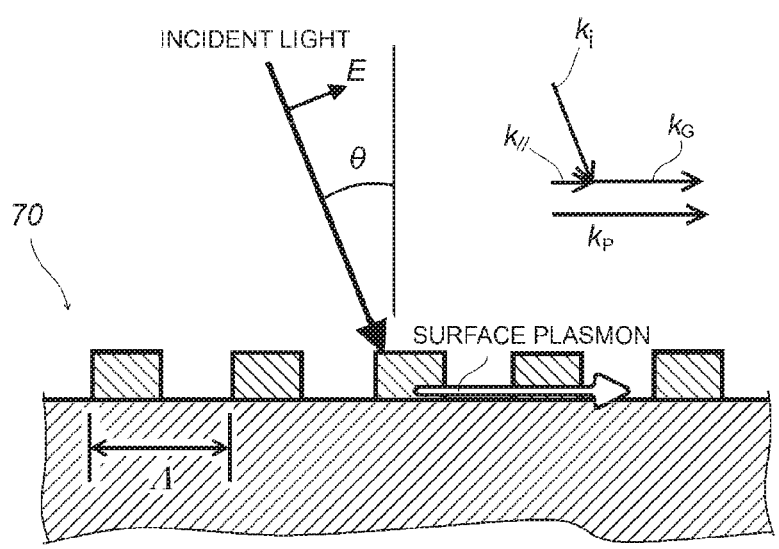
FIG. 2 is a schematic cross-sectional view indicating a general configuration of a conventional absorber, in which a diffraction grating is formed on its metal surface for surface plasmon excitation.

One technique for achieving a high light absorption uses surface plasmon resonances. The surface plasmon is an elementary excitation which is a surface wave propagating on the surface of metal, where the surface wave is formed by incident light coupled with a collective oscillation of free electrons in the metal. The absorption characteristic is described by a dispersion relation derived from the dielectric function. FIG. 1 is a graph indicating a dispersion relation between surface plasmons and light waves on a flat metal surface, where the dispersion relations are depicted for incident light that impinges on a flat metal surface (straight line 72) and for a surface plasmon (curve 74). As the incident light satisfies $\omega = ck$ ($\omega$: angular frequency, k: wave number, and c: speed of light), its relationship is represented as a straight line passing through the origin, which is referred to as the light line. The surface plasmon generated at the surface between the metal and the air and the interface between the metal and the dielectric usually cannot be excited directly by incident light from air side. To address such a constraint, a diffraction grating having a periodic structure is formed on a metal surface. FIG. 2 is a schematic cross-sectional view indicating a general configuration of a conventional absorber 70, in which a diffraction grating is formed on a metal surface for surface plasmon excitation. When a diffraction grating is present, the diffraction grating generates light in a tilted direction (for example, first-order diffraction light) as a result of constructive interference of the incident light (e.g., incident light slightly tilted from plane normal), where, in particular for a p-polarized light having an optical electric field E as in FIG. 2, a vertical component of an electric field of the diffracted light with respect to a metal surface, or a plane extending horizontally on the sheet of paper, is enhanced. In addition, as the surface plasmon travels along the surface, what matters among incident light is its wave number components parallel to the surface of the metal, which can couple with a surface plasmon and is depicted in a straight line 72P in FIG. 1. The straight line 72P represents a dispersion relation of the in-plane wave number of the incident light, or a component of wave number vector parallel to the surface. Here, the dispersion relationship of the in-plane wave number of the diffracted light is a dispersion relation shifted by the amount of grating vector $k_G = 2\pi/\Lambda$ (straight line 72D) as the effect of the diffraction grating. Absorption occurs when the sum of an in-plane wave number $k_{//}$ of the wave number vector of the incident light (component parallel to the metal surface) and the grating vector $k_G$ matches with the wave number $k_p$ of the surface plasmons, as in the relationship of the wave number shown in FIG. 2. The straight line 72D makes an intersecting point together with a curve 74 representing the dispersion relation of the surface plasmon as shown in FIG. 1, where the momentum conservation law and the energy conservation law are simultaneously satisfied, which allows energy transfer from light to surface plasmons. That is, if the diffraction grating is present, there is a possibility that surface plasmons are excited. The excited surface plasmons propagate along the metal surface while being absorbed by the metal as they propagate. This is the principle in which a conventional absorber 70 having a diffraction grating absorbs light. However, as absorption for a diffraction grating occurs at a frequency and a wavelength corresponding to the angular frequency ω of the vertical axis that gives the intersecting point, the absorption bandwidth must be narrow by nature. Furthermore, when the incident angle of light changes, the direction of the constructive interference of the diffraction grating changes according to change in the in-plane wavenumber, the resulting absorption bandwidth depends on the incident angle.

Figure 3:
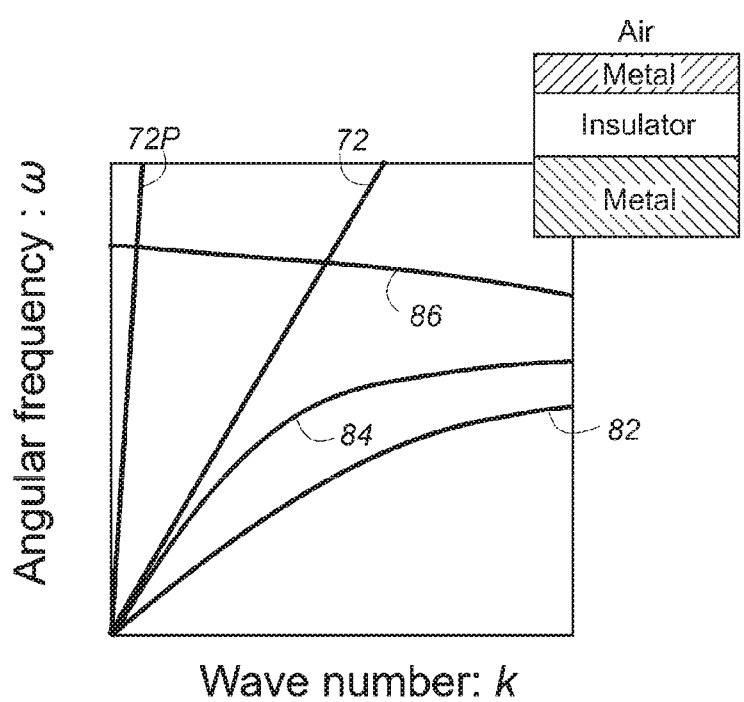
FIG. 3 is an explanatory diagram indicating a dispersion relation of a conventional absorber having an MIM structure in a graph, with which a structure of the absorber having the MIM structure.

On the other hand, in a metal-dielectric-metal (MIM) structure, the dispersion relation of surface plasmons is modified. FIG. 3 is an explanatory diagram illustrating the dispersion relation of a conventional absorber 80 having an MIM structure in a graph, to which a structure of the absorber 80 having the MIM structure is also added. In comparison with FIG. 1 of a simple metal-air interface, unique surface plasmons are obtained for the absorber 80 with the MIM structure. Specifically, there found a multitude of curves as in curves 82 and 84, or a curve having a branch on the high-frequency side as in curve 86. It should be noted a curve intersects straight lines 72 and 72P, which represent dispersion relation of incident light. According to dispersions of the incident light as the straight lines 72 and 72P and the dispersion relationship of the surface plasmon, even if the diffraction grating is not necessarily formed, absorption can occur so long as the energy of the incident light is converted into the surface plasmon at intersecting points with the curves 82 through 86. In this case, however, the number of the intersecting points are very limited. That is, the bandwidth of absorption due to surface plasmons still remains narrow only by introducing the MIM structure. In addition, even in this MIM structure, when the incident angle of light changes, the absorption band is generally shifted.

2. Light Absorber 2-1. Overview

Figure 4:
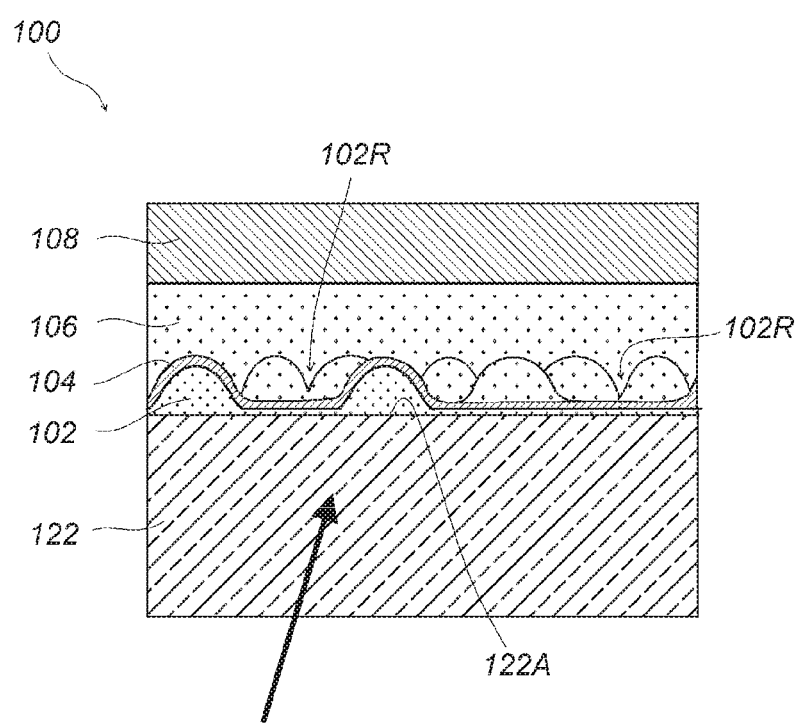
FIG. 4 is a schematic diagram indicating a general configuration of a light absorber according to an embodiment of the present invention.
Figure 5:
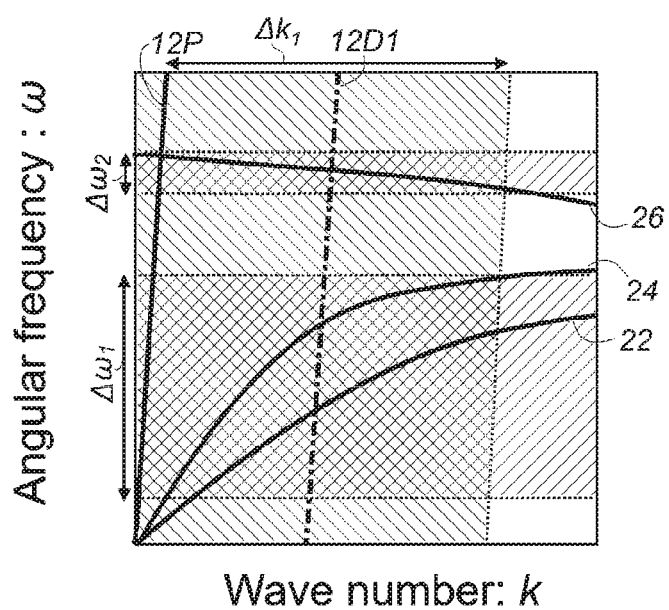
FIG. 5 illustrates a dispersion relation of the in-plane wavenumber in a graph for light diffracted by dielectric particles that are disposed in a random in-plane arrangement.

In the present invention provided is a new structure of a light absorber for widening an absorption band by incorporating randomness into an MIM structure. In this embodiment, provided is a light absorber having dielectric protrusions disposed in an in-plane random arrangement along the surface of the dielectric and a conductive thin film such as a metal. The conductive thin film is disposed on or above a part of each dielectric protrusion and on or above a part on the dielectric surface where the dielectric protrusions are not present. FIG. 4 is a schematic diagram indicating a schematic configuration of a light absorber 100. FIG. 5 depicts a dispersion relationship of the in-plane wavenumber in a graph for light diffracted by dielectric particles that are disposed in an in-plane random arrangement.

The light absorber 100 shown in FIG. 4 includes: a group of dielectric protrusions 102; a conductive thin film 104; and a conductive thick film 108. In a structure of another typical light absorber 100 the dielectric embedding layer 106 is also included. The conductive thin film 104 is disposed on at least a part of the surface of each dielectric protrusion 102. The conductive thin film 104 is most typically formed so as to be in direct contact with the surface of each dielectric protrusion 102. The light to be absorbed is incident from the conductive thin film 104 side among the conductive thin film 104 and the conductive thick film 108, which is from below side on the sheet as shown by a thick arrow in the FIG. 4.

The effect by such random arrangement is described with reference to FIG. 5. Straight lines 12P and 12D1 in FIG. 5 indicate dispersion relation of the in-plane wave number of the incident light and the diffracted light when a one-dimensional diffraction grating is adopted as shown in the FIG. 2. Employing dielectric particles for the dielectric protrusions while making the positions of the particles into an in-plane random arrangement, corresponds to employing two dimensional diffraction grating while breaking the regularity, it therefore gives distribution to the direction of the diffracted light generated by the constructive interference (diffraction angle), that is, a width is generated in the lattice vector. This phenomenon substantially corresponds to a situation where the line 12D1 comes to have a width in response to the regularity disturbance, which lead to broadening of the wave number of the diffracted light. The randomness generates a width in the wave number $\Delta k_1$ of the diffracted light (on the upper end of the graph), which results in spreading at the intersecting points with the dispersion curves 22 to 26 of the surface plasmon. Correspondingly, widths $\Delta \omega_1$ and $\Delta \omega_2$ are added to the absorption band, therefore, a wide range absorption can be expected.

The conductive thin film 104 that fits the shape of the dielectric protrusion 102 may affect other aspect than the direction of the diffracted light. Although similar curves as the dispersion curves 82 through 86 as shown in FIG. 3 are depicted for the dispersion curves 22 to 26 of the surface plasmon, the dispersion of the surface plasmon is affected by the conductive thin film 104 reflecting the unevenness. For example, a width corresponding to the unevenness of each part of the conductive thin film 104 should accompany to the distance between the conductive thin film 104 and the conductive thick film 108 via a dielectric embedding layer 106. Also, depending on the frequency, there is a possibility that localized surface plasmons may be excited due to the small size of the metal layer itself. Therefore, the dispersion of the surface plasmon is different from that of FIG. 5, and the dispersion of the surface plasmon can have a width. Such a width also has an effect of broadening the band as in the case of the width of the wave number of the above-described diffraction light, it can be said that it contributes to the broadening of the band. The above-described principles are described by a random arrangement of dielectric particles in FIG. 5, so long as the unevenness similar to unevenness realized in the dielectric particles is realized by any other method, it is possible to sufficiently expect that the same properties are realized on the basis of the necessary change. In any case, it is possible to expand absorption band of the surface plasmon by providing a fine uneven shape having, in particular, random arrangement on the metal surface for the purpose of expanding a frequency range where a dispersion curve indicating the relationship between the wavenumber (k) and a frequency (w) of the surface plasmon on the light absorber and another dispersion curve indicating the relationship between the wave number and the frequency for the diffracted light intersect with each other.

Referring back to FIG. 4. A light absorber 100 includes: a group of the dielectric protrusions 102; a conductive thin film 104; and a conductive thick film 108. In a structure of a further typical light absorber 100 the dielectric embedding layer 106 also included. The conductive thin film 104 is disposed on at least a part of the surface of each dielectric protrusions 102, and the entire surface may be covered. The conductive thin film 104 is formed in direct contact with the surface of each of the dielectric protrusions 102 in the most typical case. However, the light absorber having the same function can be produced even when the conductive thin film 104 is disposed on another layer (not shown) having a surface profile that is a substantial replicate of the surface profile of each dielectric protrusion. In a typical configuration, the light absorber 100 is formed by employing a translucent substrate such as a glass substrate 122. A surface 122A of the glass substrate 122 serve as the dielectric surface on which the dielectric protrusion 102 is disposed. The dielectric protrusions 102 are disposed in an in-plane random arrangement on the surface of the dielectric surface. The randomness produces widening to at least one of dispersion relationships to the light and the surface plasmon as described with reference to FIG. 1. In the light absorber 100, the randomness introduced into the array of the dielectric protrusions 102 may be determined suitably in accordance with the width of absorption band required.

Figure 6:
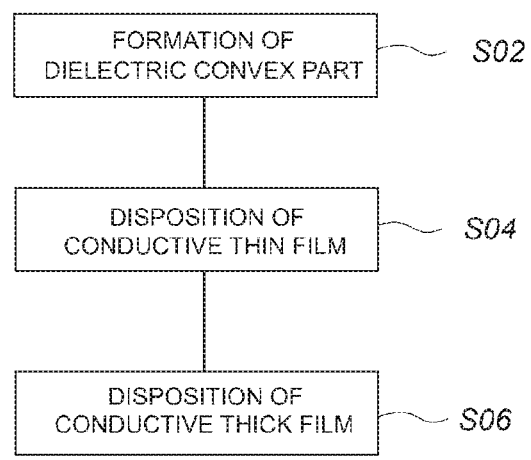
FIG. 6 is a flowchart indicating a method for manufacturing a light absorber according to an embodiment of the present invention.

A method for manufacturing such a light absorber 100 is typically as follows. FIG. 6 is a flowchart indicating a method for manufacturing the light absorber. First, a group of dielectric protrusions 102 is formed (S02). The step includes forming a group of dielectric protrusions by any technique. At that time, each of the dielectric protrusions 102 protruding from the dielectric surface is disposed so as to be positioned in an in-plane random arrangement on the dielectric surface. For this arrangement, any active and passive approaches can be employed so long as randomness even in the slightest degree can be expected. Then, a conductive thin film 104 is disposed (S04). The conductive thin film 104 is disposed on or above at least a part of a surface of each dielectric protrusion 102 in the group of the dielectric protrusions 102 and on or above at least a part of one surface 122A of the glass substrate 122, which is the dielectric surface, where the dielectric protrusions 102 are not present. Thereafter the conductive thick film 108 is formed (S06). The conductive thick film 108 is formed so as to spread out along the dielectric surface while being separate from the conductive thin film 104.

2-2. Formation of Protrusions by Dielectric Particles

Figure 7A:
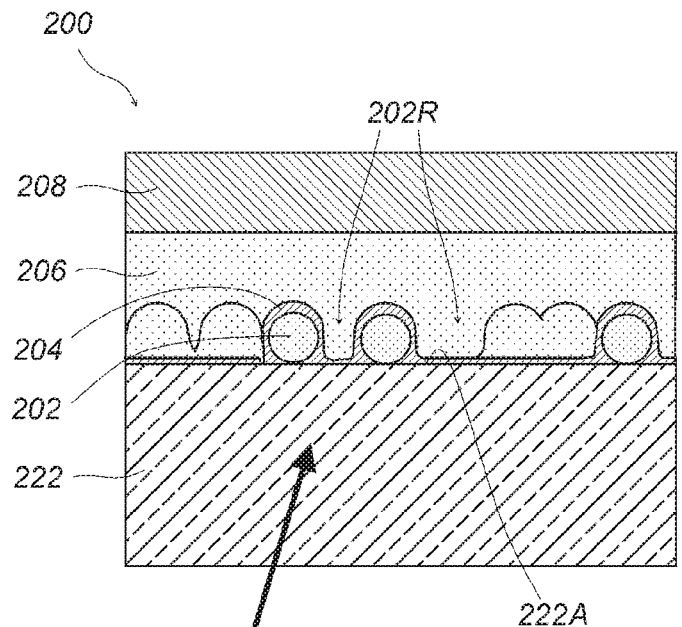
FIG. 7 illustrates an embodiment of the present invention in which dielectric particles are used for the dielectric protrusions, for a typical example (FIG. 7A) and another exemplary example (FIG. 7B).

Most typical example of the light absorber 100 in the present embodiment is one as light absorber 200 in FIG. 7A, which adopts dielectric particles. Dielectric particles 202 in the light absorber 200 are adopted for the dielectric protrusions 102 in the light absorber 100. The dielectric particles 202 are dielectric particles, such as, for example, $SiO_2$, and the particle diameter thereof is appropriately determined for the purpose of influencing the absorption band as described later. The dielectric particles 202 are randomly disposed on one surface 222A of the glass substrate 222. The shape of the dielectric particles that can be adopted is not particularly limited. The conductive thin film 204 is disposed on at least the surface of the glass substrate, which is a dielectric surface 222A, at least a part of a portion where particles are not present, and on at least a part of a region on the other side (upper side on the sheet) of the surface 222A side as viewed from the dielectric particles 202, which is the dielectric surface where the dielectric particles 202 are disposed.

Figure 8:
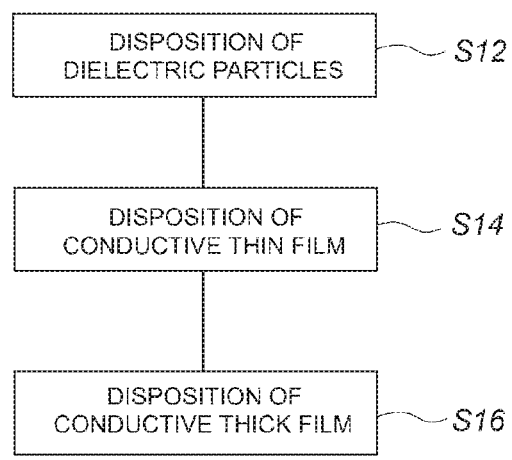
FIG. 8 is a flowchart indicating a method for manufacturing the light absorber in the case where dielectric particles are employed in an embodiment of the present invention.

FIG. 8 is a flowchart indicating a method for manufacturing a light absorber in the case where the dielectric particles are used. The flowchart in which dielectric particles are used corresponds to the manufacturing method shown in FIG. 6. First, dielectric particles are disposed (S12) for a dielectric protrusion formation (S01). Each dielectric particle is disposed in an in-plane random arrangement in contact with a surface of a substrate having a two-dimensional surface as a dielectric surface (i.e., a glass substrate 222 with a surface 222A, FIG. 7A). Various techniques for disposing the dielectric particles in an in-plane random arrangement can be adopted. Most typically, the dielectric particles are randomly arranged in the plane by bringing the dispersion liquid of the dielectric particles into contact with the substrate, and then fixing the dielectric particle onto the surface of the substrate. The density of the dielectric particles arranged at random positions (surface density) can be determined by the concentration of the particle dispersion. Therefore, a reference value is set for an absorption coefficient or an extinction coefficient which is an index for determining performance of absorption, for example, the concentration of the dispersion liquid by which the reference value is obtained is also preferably determined to some extent. In this case, the fluctuation caused by the experiment is reflected, a light absorber having an intended absorption can be produced with good reproducibility by using a dispersion liquid having a concentration higher than such concentration. The dielectric particles 202 that can be employed in this application include, for example, silica ($SiO_2$) particles and various plastic particles such as polystyrene latex.

The substrate may not be a single material, thus a material having some surface layer or a thin film can also be used. Also, for the arrangement of the conductive thin film (S04), the conductive thin film 204 is disposed on or above at least a part of a region on a surface of each dielectric particle 202 in the group of the dielectric particles, the region being on a side of each dielectric particle, the side facing the other side of the dielectric surface side as viewed from each dielectric particle 202, and on or above at least a part of the dielectric surface where the dielectric particles 202 are not present (S14). It is to be noted that the formation of the conductive thick film (S16) is the same as above in this case.

In addition to the above-mentioned silica, various kinds of silica or the like can be employed for the dielectric particles 202 in the light absorber 200 in FIG. 7A, and there are no particular limitation on the shape, particle size, particle size distribution, and manufacturing process. From practical point of view, the material of the dielectric particles 202 may affect randomness in the arrangement, or adhesion property to the substrate and the conductive thin film. In order to select an absorption band, shape, particle size, and particle size distribution of the dielectric particles 202 are adjusted to be appropriate. In the present embodiment, the dielectric particles at least adds unevenness onto the conductive thin film by their shape serving as protrusions.

Figure 7B:
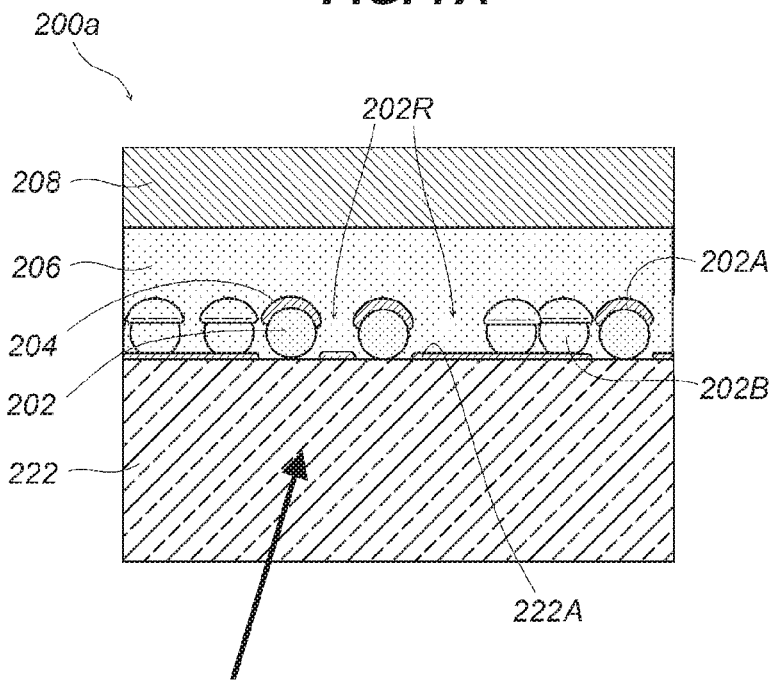

The light absorber manufactured according to the manufacturing process of FIG. 8 may have a structure of a light absorber 200a shown in FIG. 7B, which is another typical example. That is, at the disposition step of the conductive thin film 204 (S14), the conductive thin film 204 on the surface of the dielectric particle 202 may not cover their lower surface facing the glass substrate 222 and the side surface 202B, while the top surface 202A is covered. Such a structure can also be adopted for the light absorber of the present embodiment. In this structure, the conductive thin film 204 formed on the surface of the dielectric particle 202 is separated at a recess portion 202R from the conductive thin film 204 formed on a surface 222A. The conductor regions of the conductive thin film 204 formed on the surface of a plurality of adjacent dielectric particles 202 are made into isolated island shapes for the dielectric particles 202, except when the plurality of the adjacent dielectric particles is closely positioned and is in contact with each other. In contrast, in the case the plurality of adjacent dielectric particles 202 is in contact with each other or substantially in contact with each other, the conductor regions of the conductor thin film 204 on the plurality of dielectric particles 202 may be made contiguous to form a conductor region having a shape that spreads over the plurality of the dielectric particles 202. Therefore, in the light absorber 200a shown in FIG. 7B, randomness is introduced into the position of the island-shaped conductor regions, and randomness is also introduced into the size of the conductor regions. In such a structure, it can be said that the conductive thin film 204 is disposed on at least a part of a region on a surface oriented upward of the sheet, which is the other side for a side facing the surface 222A among the surfaces of the dielectric particles 202.

2-3. Conductive Thin Film and Conductive Thick Film

In each configuration of the present embodiment, conductive thin films 104, 204 and conductive thick films 108, 208 can be made of a material having at least some conductivity. At that time, the material of the metal is selected so that it exhibits some response to the frequency in the absorption wavelength band while preventing complete transmission. When the absorption band is set to the visible region, the near-infrared region, and the infrared region, the metal is selected from gold, silver, aluminum, or an alloy containing these components in a part thereof. In addition to metals, for example, an oxide semiconductor can also be adopted so long as the absorption is expected in the infrared region, as it shows a property of a metal manner behavior against infrared light.

For example, in applications requiring an absorption band in the infrared region and a transmission band in the visible region, an oxide semiconductor showing a metallic behavior in the infrared band without showing the metallic behavior in the visible is one of suitable materials. The plasma frequency of a material can be adopted as a measure of the metal behavior. That is, it is possible to select a material having the plasma frequency lower than the frequency of the wavelength range to be transmitted for realizing absorption capability at a frequency lower than the plasma frequency, or at a longer wavelength region. It is easy to secure a sufficient absorption bandwidth by applying the configuration of the present embodiment. Non exhaustive examples of oxide semiconductor materials that can be employed in this embodiment are: $In_2O_3$ (indium oxide), ITO (tin-doped indium oxide), $Sr_xY_{1-x}TiO_3$ (yttrium-doped strontium titanate), $SnO_2$:F (fluorine-doped tin oxide), ZnO:Al or ZnO:Ga (aluminum or gallium-doped zinc oxide), $TiO_2$:Nb (niobium doped titanium oxide), and $Cd_2SnO_4$ (cadmium tin oxide). Also, organic conductive materials such as PEDOT: PSS (poly (3,4-ethynylthiophene) polystyrene sulfonate) may be adopted.

By way of example of the light absorber 200, the thickness of each of the conductive thin film and the conductive thick film is typically determined as follows. First, a conductive thin film 204 may not function properly when it is too thin, as the surface plasmon is hardly excited in a wavelength region where it is desired to be absorbed. On the other hand, too thick is not preferable as excessive reflection will occur. The conductive thin film 204 can be made to have a thickness showing a semi-transmissive property in a wavelength range desired to be absorbed such that light passes through itself to some extent. The conductive thick film 208 is preferably a thickness capable of sufficiently preventing transmission in a wavelength range desired to be absorbed. That is, it is preferable to set the thickness such that failure of absorbing the light due to the transmission is effectively prevented. In this case, the thickness of the conductive thick film 208 might be such that a film made with the same material having a thickness that exhibit reflection in the wavelength region for absorption. In the case where transmission and absorption are made compatible depending on wavelength bands, transmittance in transmission wavelength band is also taken into account.

The optical properties of the conductive thin film is affected by the presence of dielectric protrusions 102 and dielectric particles 202. Therefore, the light transmittance can be different from a case where a layer having the same thickness is formed on a plane. Furthermore, as the effect of the shape of the dielectric protrusions 102 and the dielectric particles 202, the conductive thin film may have a large number of holes, may be fragmented, or may have steps or wrinkles.

2-4. Other Components for Functioning as Light Absorbers

In the light absorber 100 (FIG. 4) and the light absorber 200 (FIG. 7) the conductive thin films 104, 204 are covered respectively by the dielectric embedding layers 106, 206. The conductive thick films 108, 208 are disposed on or above the other surface of the dielectric embedding layers 106, 206. Preferably, the dielectric embedding layers 106, 206 include a material that has smoothing capability to some extent over the profiles of the dielectric protrusions 102 and the dielectric particles 202. When such a material is adopted, the profiles of the protruding portions of the dielectric protrusions 102 and the dielectric particles 202 are not replicated as it is to the conductive thick film 108, 208. However, the operation of the absorber is maintained when there is unevenness on an interface of the conductive thick films 108, 208 facing the dielectric protrusions 102 and the dielectric particles 202, therefore perfect flatness is not required for the dielectric embedding layers 106, 206.

Figure 9A:
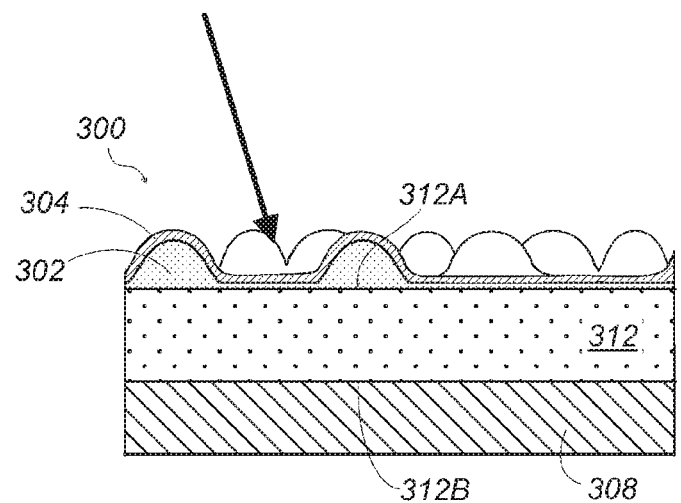
FIG. 9 is a schematic diagram depicting a case where the light is incident from the same side as the protruding direction of the dielectric protrusions in an embodiment of the present invention.
Figure 9B:
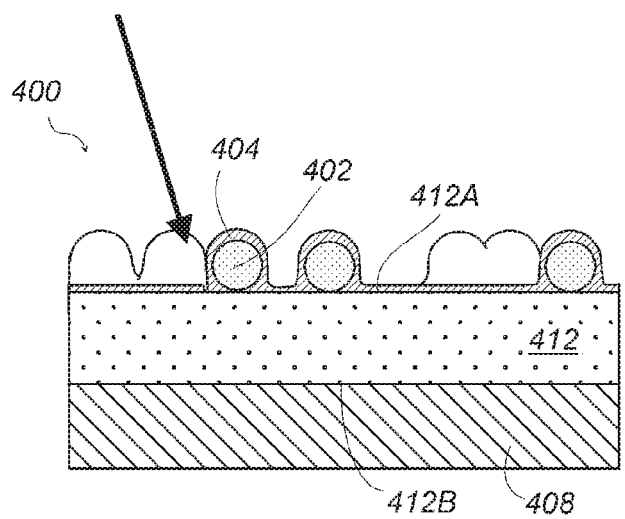

For the light absorber 100 (FIG. 4) and the light absorber 200 (FIG. 7), light is incident from the side of the glass substrates 122, 222 (shown by a thick solid line arrow). More generally, the incident direction of light in the present embodiment is a direction in which light is incident on the conductive thin films 104, 204 first, among the conductive thin films 104, 204 and the conductive thick films 108, 208. Therefore, the present embodiment can be realized by a configuration different from that of FIGS. 4 and 7. FIG. 9 is a schematic diagram showing a case where the light is made incident from the same side as the protruding direction of the dielectric protrusions, in a structure in which a dielectric protrusion is provided (FIG. 9A), and a structure in which the dielectric protrusion is realized by the dielectric particles (FIG. 9B). In the cases of these structures, light to be absorbed (thick solid arrow) is incident from above on the sheet. A light absorber 300 includes: a group of a dielectric protrusions 302; a conductive thin film 304; and a conductive thick film 308. In another exemplary configuration of the light absorber 300, a dielectric film 312 serving as a substrate is provided, on at least a side of one surface 312A of which the group of the dielectric protrusions 302 is disposed. The dielectric protrusions 302 are disposed in an in-plane random arrangement along the one surface 312A. The conductive thick film 308 is disposed on the side of the other surface 312B of the dielectric film 312. The conductive thin film 304 is disposed at least on or above a part of or all of the one surface 312A as a substrate where the dielectric protrusions are not formed, and a part of or all of the surface of each of the dielectric protrusions 302. The conductive thin film 304 is most typically formed so as to be in direct contact with the surface of each of the dielectric protrusions 302. The light to be absorbed in the structure is incident from above on the sheet, or from the side of the dielectric protrusions 102 in terms of the conductive thin film 304 and the conductive thick film 308. Similarly, the light absorber 400 shown in FIG. 9B includes: a group of dielectric particles 402; a conductive thin film 304; and a conductive thick film 308. In a structure of yet another exemplary light absorber 400, a dielectric film 412 serving as a substrate is included, where the group of dielectric particles 402 is located on the side of at least one surface 412A. The dielectric particles 402 are disposed in an in-plane random arrangement along one surface 412A. The conductive thick film 408 is disposed on the side of the other surface 412B of the dielectric film 412. The conductive thin film 404 is disposed at least on a part of or all of the dielectric surface 412A where the dielectric particles 402 are not disposed, and on a part of or all of a side (the upper side of the sheet) among each of the surfaces of the dielectric particles 402. Here, the side is oriented to the other side of the surface 412A, as viewed form the dielectric particle 402, which serves as the dielectric surface for disposing the dielectric particles 402.

Thus, the conductive thin film is oriented to the incident side of light when viewed from the conductive thick film. Although the light absorbers 100, 200 and the light absorbers 300, 400 have reversed directions of the incidence of light when viewed from the conductive thin film as well as when viewed from the profiles of the dielectric protrusions and the dielectric particles, it does not produce any significant difference in the operation of the conductive thin films or their property to the extent that impedes adjustment of the other conditions.

In any of the light absorbers 100, 200, 300, and 400, portions between adjacent ones of the dielectric protrusions 102 or the dielectric particles 202, which are referred to as recess portions 102R, 202R for convenience, may have the conductive thin film 104, 204 thereon. The material forming the recess portions 102R, 202R depends on actual material of the dielectric protrusions 102 and on the arrangement density of the dielectric particles 202. In the case when the density of arrangement is high, recess portions are merely concave area formed between adjacent dielectric protrusions 102, whereas in the case when the density of the arrangement is low, they are the surface 122A. Such a difference affects the absorption characteristics, as it may alter diffraction and scattering characteristics of light, and therefore the characteristics of the excited surface plasmons.

2-5. Optical Distance Between Conductive Thin Film and Conductive Thick Film

A width of an absorption wavelength band for a light absorber is determined by protrusions having a random arrangement, which is mainly introduced by dielectric protrusions 102 and dielectric particles 202 (FIGS. 4 and 7). In contrast, a wavelength or a frequency in an absorption wavelength band is affected by an optical distance between the conductive thin film and the conductive thick film, in addition to the material of the conductive thin film and the conductive thick film stated above. The optical distance can be easily set by formation condition of the dielectric embedding layer for a case when the dielectric embedding layer is adopted. In a structure using the dielectric film shown in FIG. 9, the optical distance is also determined by the thickness of the dielectric film. In general, the center of the absorption wavelength is shifted to longer wavelength side when the optical path difference is increased, and shifted to the shorter wavelength side when it is reduced. In these settings, the height of the dielectric protrusions and the particle size of the dielectric particles may also have significant influences. Examples of a dielectric film used in this application include a PET (polyethylene terephthalate) film having a thickness of about 1 μm or more for infrared applications.

3. Applications 3-1. Bolometer

The light absorber according to an embodiment of the present invention may be used for an absorber of a bolometer used as a power meter in the infrared range or longer terahertz wave range. The preferable properties of the bolometer includes sufficient sensitivity, less dependency on the direction of the electromagnetic wave, and less temporal change; therefore, gold-black or the like has been conventionally adopted. The light absorber of the present embodiment can satisfy these properties.

3-2. Infrared Absorber

For an absorber exhibiting good characteristics in an infrared region as represented by the bolometer described above, the performance (absorption bandwidth, etc.) is generally determined according to characteristics of a material such as gold-black. For this reason, it is not easy to design an absorption band for a specific field of application, and therefore it is difficult to design, for example, a material having an absorption band matched with the atmospheric window. In the absorber of the present embodiment, it is possible to design an absorption band with a high degree of freedom, and the absorber will be suitable for such applications.

3-3. Solar Thermal Power Generating Device

Solar thermal power generating devices use the light in the entire spectrum region of the sunlight for a heat source, unlike solar cells. By adopting the light absorber of the present embodiment, energy in the entire spectral range of sunlight (0.3 μm to 2.5 μm) can be absorbed totally, and a highly efficient light absorber can be produced. Therefore, a light absorber (photothermal conversion body) suitable for solar thermal power generating device can be provided by the present embodiment.

4. Examples

The present embodiment will be described more specifically based on the following examples. The contents of the present invention are not limited to the scope of the present embodiment. Furthermore, the already described drawings are also referred to by the same reference numerals.

4-1. Example Protocols for Manufacturing Samples

A sample for a light absorber 200 utilizing the dielectric particles of the embodiment described above was fabricated. In an example fabrication, based on sample 2, a glass substrate 222 (FIG. 7) of 38.1×25.4 mm$^2$ was immersed into an aqueous solution of an amino propyl trimethoxysilane at a volume ratio of 1% for at least one minute, and after pulling it up, it was rinsed with water. Then it was baked in an oven at 50° C. for 10 minutes. Next, the glass substrate on which amino propyl trimethoxysilane was fixed was Immersed into a 5% aqueous dispersion of $SiO_2$ particles (colloidal silica microspheres, Polysciences, Inc.) of a predetermined particle size (for sample 2, a manufacturer's nominal value: 100 nm) for at least one minute, then was pulled up and rinsed with water. Thereafter, baking was performed in an oven at 50° C. for 10 minutes. An MIM structure was formed by the following method. A silver thin film was deposited by a vacuum deposition method for the conductive thin film 204 on affixed dielectric particles 202 under a condition that the silver thin film should be deposited to have a thickness of 20 nm if deposited on a flat surface. This deposition was performed by resistance heating while a silver wire was used as a vapor deposition source with a vapor deposition rate of 0.1 nm/s at a pressure of $5.0 \times 10^{-4}$ Pa or less. Thereafter, the dielectric embedding layer 206, PMMA having a mass ratio of 3% in cellosolve acetate was deposited by spin coating. Usually 500 to 5000 rpm would produce required film thickness for obtaining the effect of light absorption in the present invention. Finally, a silver thin film having a film thickness of 100 nm serving as a conductive thick film 208 was formed by vacuum deposition.

Furthermore, the conditions for a manufacturing of samples of the present invention were varied in various aspects to identify the relationship between the light absorption capability and manufacturing condition. Specifically, the particle size of the $SiO_2$ particles serving as the dielectric particles 202, the particle density of the particles, the film thickness of the conductive thin film 204, and the film thickness of the dielectric embedding layer 206, of PMMA (thickness from the surface 222A) were changed. In Table 1, the conditions of the prepared sample are listed. For other sample than Sample 2, other conditions were adopted than those described in the manufacturing process above. Furthermore, at several stages during production of several samples for the light absorber 200 of the present embodiment, atomic force microscope (AFM) images were captured.

the conductive thick film 208 is formed, therefore dielectric particles 202 and the conductive thin film 204 are buried within the thickness. Also, for the conductive thick film 208 in each sample, the same kind of material as the conductive thin film 204 of each sample is adopted with a sufficient thickness so as not to cause light transmission.

4-2. Results

Figure 10A:
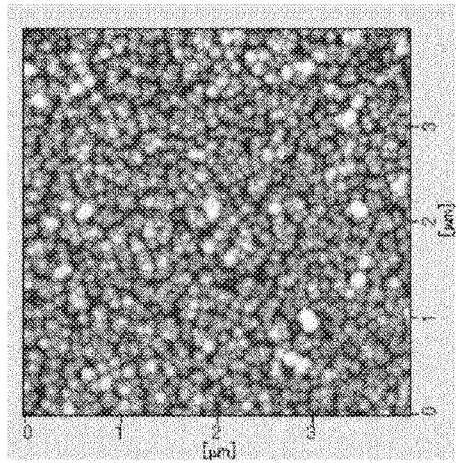
FIG. 10 includes AFM images observed during the process for manufacturing light absorber samples for one example of the present invention; for an AFM image immediately after the formation of the conductive thin film 204 on the dielectric particles 202 (FIG. 10A), and one immediately after the formation of dielectric embedding layer 206 is formed (FIG. 10B).
Figure 10B:
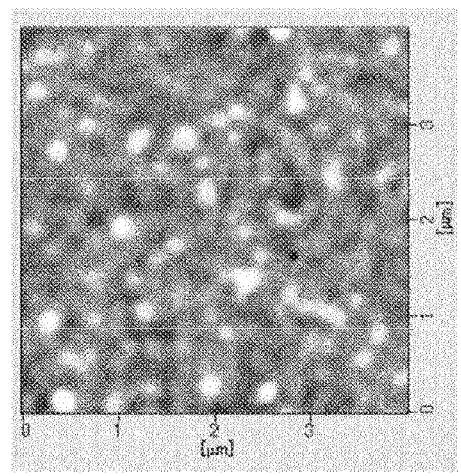

FIG. 10 includes atomic force microscope (AFM) images captured during production of Sample 1 of a light absorber 200. They indicate samples on which the particles having a diameter of 50 nm were formed at a dispersion liquid concentration of 100%, and at a stage after an aluminum having a thickness of 14.3 nm was formed for the conductive thin film 204 (FIG. 10A), and at another stage a PMMA layer (152 nm thick) was formed for the dielectric embedding layer 204 on the conductive thin film 204, (FIG. 10B). Note that the AFM image cannot be captured due to mobility of the particles if the particles are fixed only, therefore, images were captured only after the aluminum was deposited. Table 2 summarizes characteristic values measured from each AFM image, together with ones for aluminum (thickness: 14.3 nm) deposited directly on the glass substrate (not shown) without providing any particles.

TABLE 1

Figure 12A:
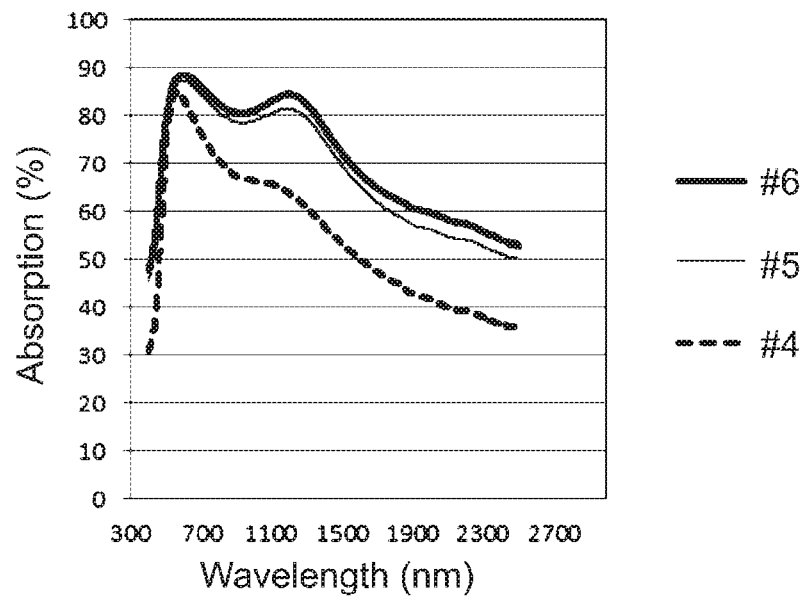
FIG. 12 includes graphs for an absorption spectrum (FIG. 12A) and an extinction spectrum (FIG. 12B) manufactured while changing the concentration of the particle dispersion liquid for forming dielectric particles 202 for an example of the present invention.
Figure 12B:
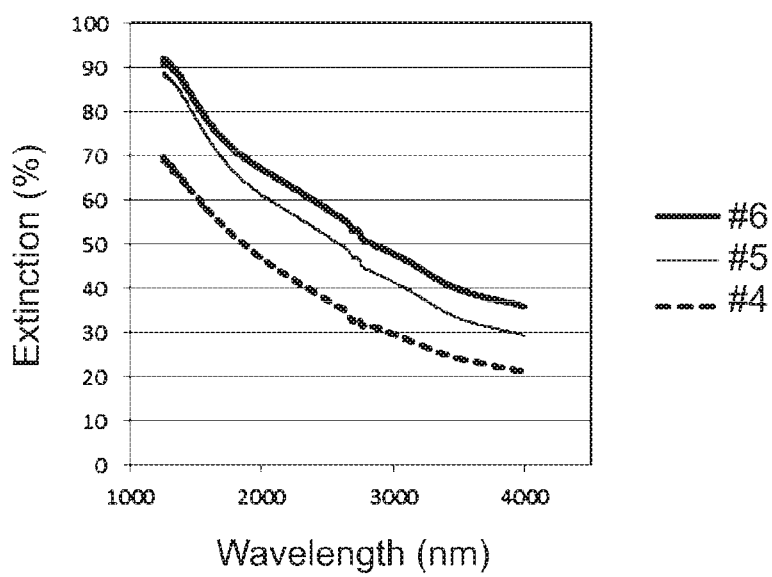
Figure 13A:
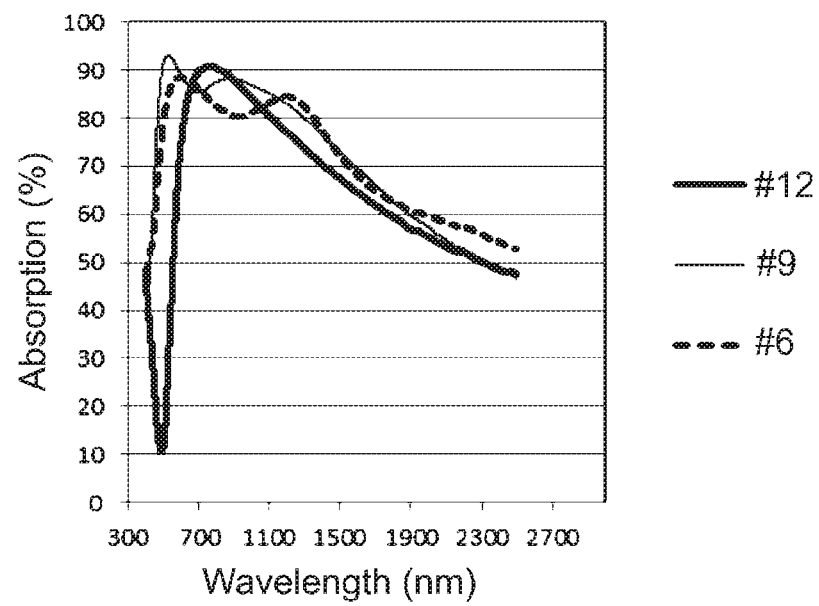
FIG. 13 includes graphs for an absorption spectrum (FIG. 13A) and an extinction spectrum (FIG. 13B) for a light absorber sample manufactured while changing the particle diameter of dielectric particles 202 for an example of the present invention.
Figure 13B:
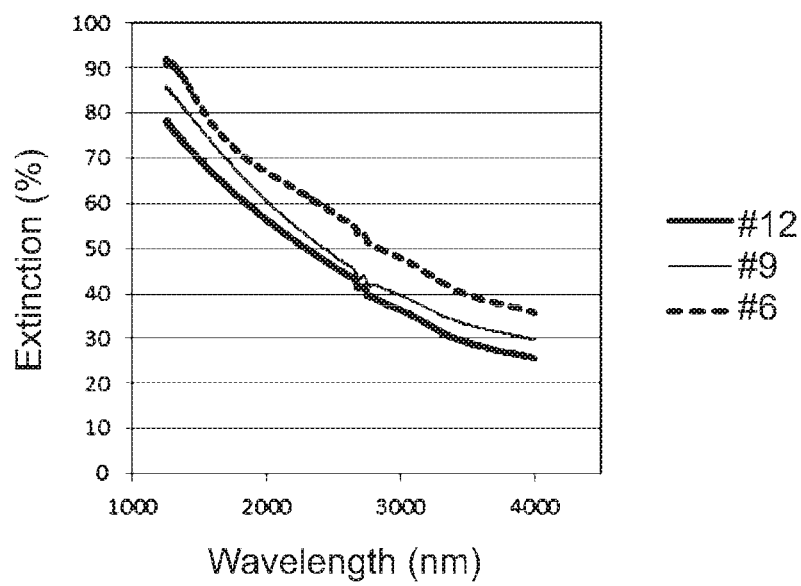
Figure 14:
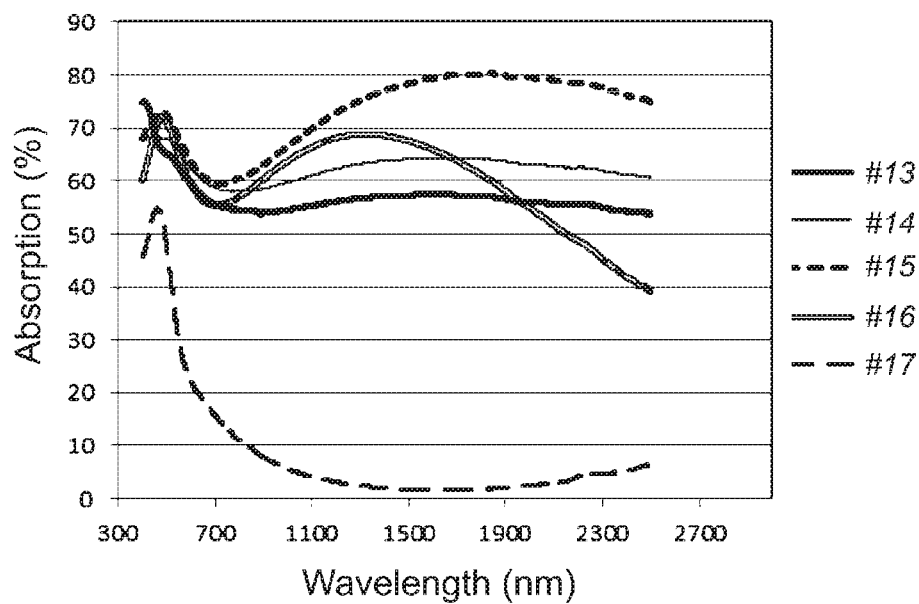
FIG. 14 is a graph of the absorption spectrum of the light absorber sample for an example of the present invention measured by changing the thickness of the conductive thin film 204 made of silver.
Figure 18A:
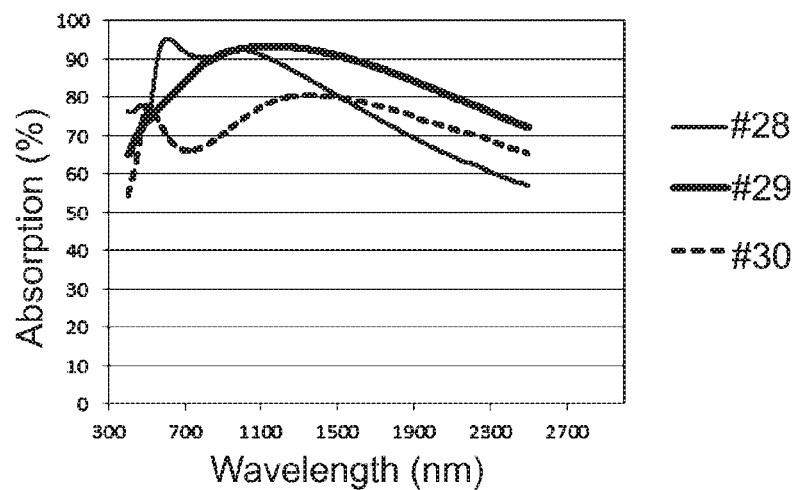
FIG. 18 includes graphs of the absorption spectrum (FIG. 18A) and an extinction spectrum (FIG. 18B) for the light absorber sample where gold, aluminum, and silver are adopted for the conductive thin- and thick films, and thicknesses of the conductive thin film and the dielectric embedding layer are optimized. They are the experimental results in which broadband absorption is confirmed regardless of the type of the conductive thin film in an example of an embodiment of the present invention.
Figure 18B:
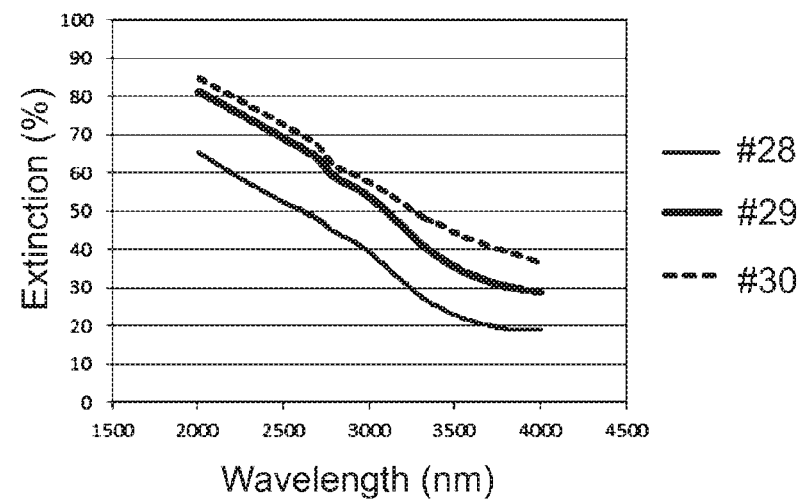
Figure 19:
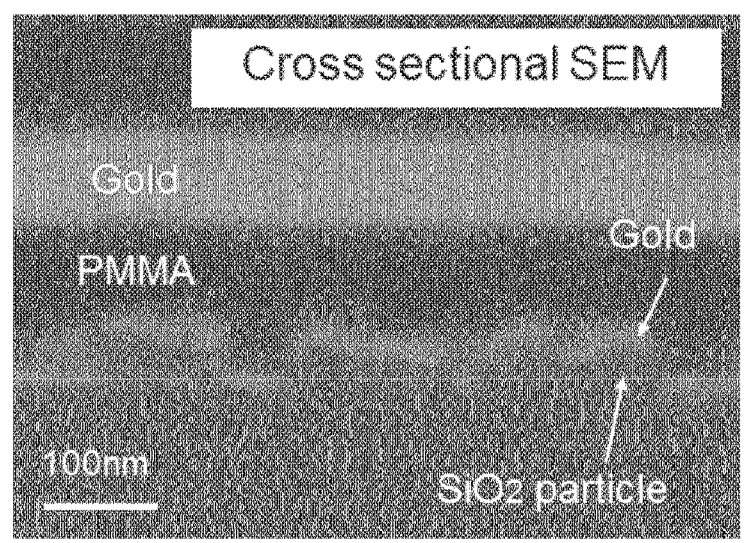
FIG. 19 is a SEM image that captures a cross section of a sample for an example of an embodiment of the present invention.

| # | Particle Diameter (nm) | Dispersion Concentration (%) | Conductive Film | Thickness (nm) | PMMA Thickness (nm) | Image/Graph | Remarks |
|---|---|---|---|---|---|---|---|
| 1 | 50 | 100 | Al | 14.3 | 152 | FIG. 10 | |
| 2 | 100 | 100 | Ag | 20 | | FIG. 11 | For |
| 3 | | 10 | | | | | Observation |
| 4 | | 10 | | 12.4 | 149 | FIG. 12 | |
| 5 | | 40 | | | | | |
| 6 | | 100 | | | | FIGS. 12 and 13 | |
| 7 | 50 | 10 | | | | — | |
| 8 | | 50 | | | | | |
| 9 | | 100 | | | | FIG. 13 | |
| 10 | 10 | 10 | | | | — | |
| 11 | | 30 | | | | | |
| 12 | | 50 | | | | FIG. 13 | |
| 13 | 50 | 100 | | 10 | 140 | FIG. 14 | |
| 14 | | | | 20 | | | |
| 15 | | | | 30 | | | |
| 16 | | | | 40 | | | |
| 17 | | | | 50 | | | |
| 18 | | | | 16.1 | 90.6 | FIGS. 15 and | |
| 19 | | | | | 92.4 | 17 (for #12 only) | |
| 20 | | | | | 123 | | |
| 21 | | | | | 155 | | |
| 22 | | | | | 191 | | |
| 23 | | | Au | 19.6 | 80.1 | FIG. 16 | |
| 24 | | | | | 96.3 | | |
| 25 | | | | | 131 | | |
| 26 | | | | | 157 | | |
| 27 | | | | | 196 | | |
| 28 | | | | 12.2 | 124.5 | FIGS. 18 and 19 | |
| 29 | | | Al | 23 | 138 | FIG. 18 | |
| 30 | | | Ag | 19 | 142 | | |

In table 1, each column represents a sample number, particle diameter (manufacturer's nominal value) of dielectric particles 202, dispersion liquid concentration, material of the conductive thin film 204, the thickness thereof, the thickness of PMMA for the dielectric embedding layer 206, a corresponding drawing number, and remarks, respectively. It is to be noted that the concentration of the dispersion liquid means a dilution ratio (the reciprocal of dilution magnification) of a dispersion liquid containing particles having a mass ratio of 5% by water, in which 100% refers to no dilution. The PMMA thickness for the dielectric embedding layer 206 is from the surface 222A to the surface on which

TABLE 2

| | Al surface | Particle/Al (FIG. 10A) | Particle/ Al/PMMA (FIG. 10B) |
|---|---|---|---|
| Arithmetic Mean Roughness (Ra), nm | 7.004E−01 | 1.253E+01 | 1.576E+00 |
| Maximum Peak-Valley (P-V) Difference, nm | 2.024E+01 | 1.126E+02 | 3.627E+01 |
| Root Mean Squared (RMS) Roughness, nm | 9.159E−01 | 1.568E+01 | 2.220E+00 |

For example, when a comparison is made based on root mean squared roughness (RMS), about 0.9 nm for an aluminum surface in which no particles are disposed is increased to 15.7 nm for aluminum disposed on the surface of the particles (FIG. 10A). Furthermore, when PMMA is formed, it is then reduced to 2.2 nm. This shows that PMMA actually flattens the roughness produced by the particles, and that PMMA plays the role of an embedding layer. The other measures (arithmetic mean roughness Ra and maximum peak-valley difference) also behaved similarly.

Figure 11A:
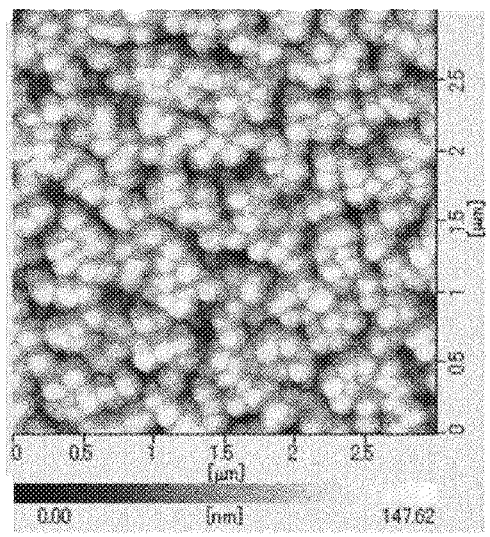
FIG. 11 includes AFM images with different concentrations for particle dispersion liquid during manufacturing in an example of the present invention; for a particle dispersion liquid concentration of 100% (FIG. 11A) and for that of 10% (FIG. 11B).
Figure 11B:
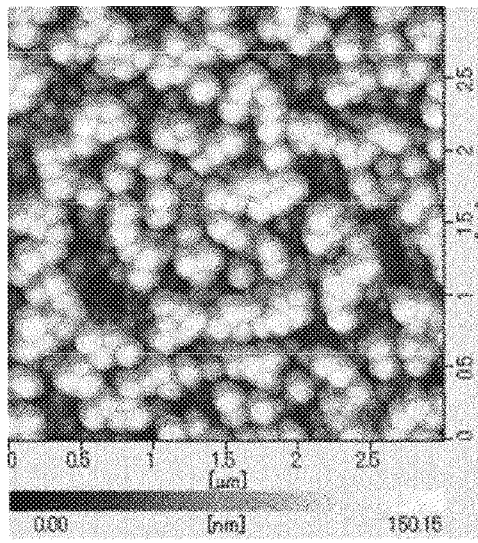

FIG. 11 includes AFM images obtained from Samples 2 and 3 that were manufactured to the middle of the process for observing cases when conditions are varied for changing particle density (FIGS. 11A and 11B, respectively). In addition, for Samples 2 and 3, the particle size of the dielectric particle 202 is 100 nm, and silver having a thickness of 20 nm was formed for the conductive thin film 204. Also in this case, it was unable to capture the AFM image for particles before forming the conductive thin film 204, and it became possible to do so after the formation of a silver film for the conductive thin film 204; therefore, the observation was made prior to the formation of the dielectric embedding layer 206. As can be seen on FIGS. 11A and 11B, it was confirmed that a number of dielectric particles 202 were disposed in a random arrangement for both samples.

Next, the absorption spectrum of the sample of each condition was measured. The measurement results are shown in FIGS. 12 to 17. The measurement was performed with, in addition to an ultraviolet visible spectrophotometer (UV/VIS), the Fourier transform infrared spectrophotometer (FT-IR) except Samples 13 to 17, and absorption was determined by the reflectivity measurement. Specifically, in UV/VIS the sum of scattered light and reflected light of a sample was measured using an integrating sphere, and spectrum of absorptance or absorption was obtained by subtracting the value from 100%. For the FT-IR the incident angle $\theta$ of the sample was set to 5° to measure the reflected light form the sample, except ones specifically denoted, for subtracting the measured value from 100%, thereby the extinction ratio spectra of the samples were calculated. In addition to absorption, the extinction ratio spectra may include a decrease in light power due to scattering. The wavelength ranges were a wavelength of 400 nm to 2500 nm for UV/VIS measurement and a wavelength of 1250 nm to 4,000 nm for FT-IR.

Samples 4-6 exhibited absorption spectra as in FIG. 12, where the Samples 4-6 were prepared for clarifying the difference in the particle density of the dielectric particles 202 by changing the dispersion liquid concentration. FIG. 12A is an absorption obtained by UV/VIS, whereas FIG. 12B is an extinction by FT-IR. This result shows that, the dispersion liquid of a concentration of 100% (undiluted solution), that is, an undiluted solution containing $SiO_2$ particles having a mass ratio of 5%, indicated the highest absorption. In addition, the higher the particle density was, the higher the data of the higher absorption obtained for Samples 7-9 (the dispersion liquid concentration is changed with particle size of 50 nm) and Samples 10 to 12 (the dispersion liquid concentration is changed with particle size of 10 nm). The fact that increased affixed particle density (particle count per area) due to increased concentration of the dispersion liquid is actually observed. As shown in FIG. 11, Sample 2 (FIG. 11A), which is obtained from 100% concentration of the dispersion liquid of the particles, has a higher particle density than Sample 3 (FIG. 11B) obtained for 10% concentration of the same kind.

Next, for studying the particle size effect in the dielectric particles 202, samples with highest particle density were compared while changing the particle size to 100, 50, and 10 nm (Samples 6, 9, and 12; FIG. 13). The dispersion liquid concentration was 50% for Sample 12 of a diameter of 10 nm, and was 100% for the other samples. No significant difference in the infrared region was observed in these samples. In the measurement results of FT-IR, the extinction became higher as the particle size increased. However, the extinction includes scattering, thus it is considered that the actual absorption cannot be discussed, as the scattering intensity becomes higher as the particle size increases.

The thickness of silver for the conductive thin film 204 was changed from 10 nm to 50 nm, with 10 nm step, for Samples 13-17 (FIG. 14). Of these, a sample with the thickness of 30 nm (Sample 15) indicated a maximum absorption ratio in a wavelength region of 1,000 nm or above. Furthermore, when the film thickness was increased to 50 nm (Sample 17), it was observed that the absorption ratio sharply decreased. From this, when an absorber in a wavelength range of 1000 nm or more is to be manufactured, the upper limit for the thickness of the conductive thin film 204 should be about 50 nm, when it is made of silver. In addition, it was confirmed based on the actual investigation that the lower limit of the thickness would be 10 nm, which could be of practical use.

Figure 15A:
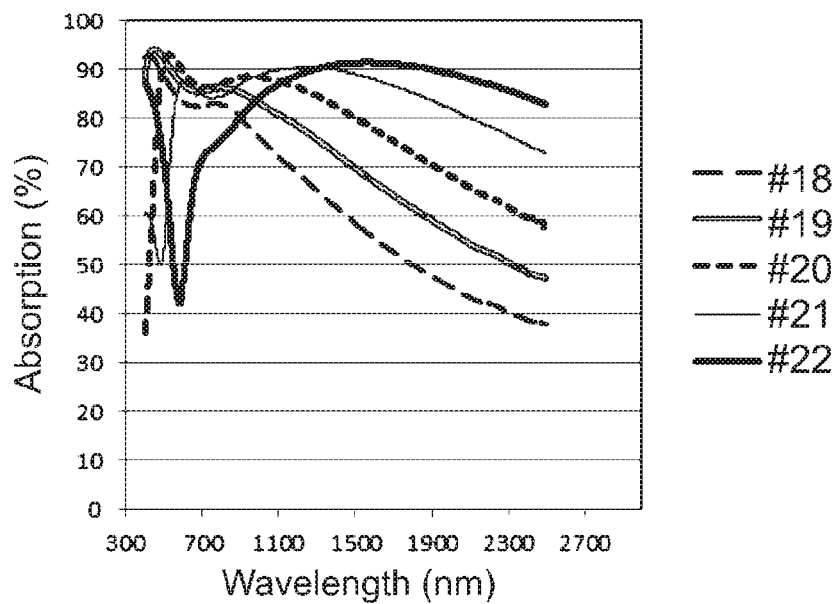
FIG. 15 includes graphs for an absorption spectrum (FIG. 15A) and an extinction spectrum (FIG. 15B) for a light absorber sample for an example of the present invention manufactured while changing the thickness of the dielectric embedding layer 206 with the conductive thin film 204 made of silver.
Figure 15B:
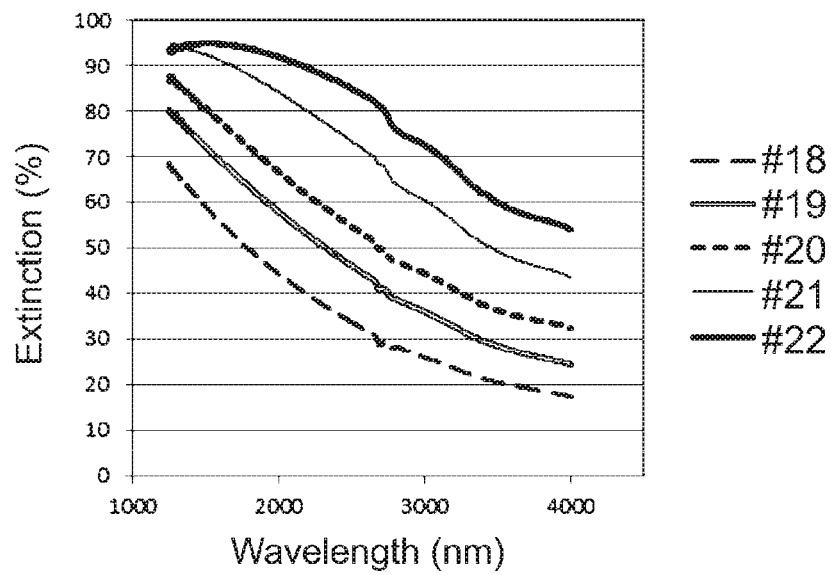
Figure 16A:
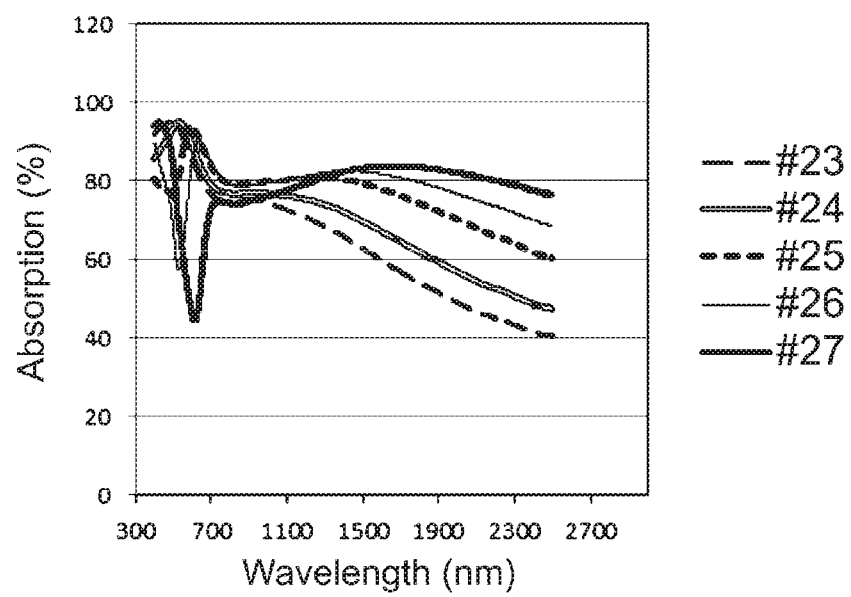
FIG. 16 includes graphs for an absorption spectrum (FIG. 16A) and an extinction ratio spectrum (FIG. 16B) for a light absorber sample for an example of an embodiment of the present invention manufactured while changing the thickness of the dielectric embedding layer 206 with the conductive thin film 204 made of gold.
Figure 16B:
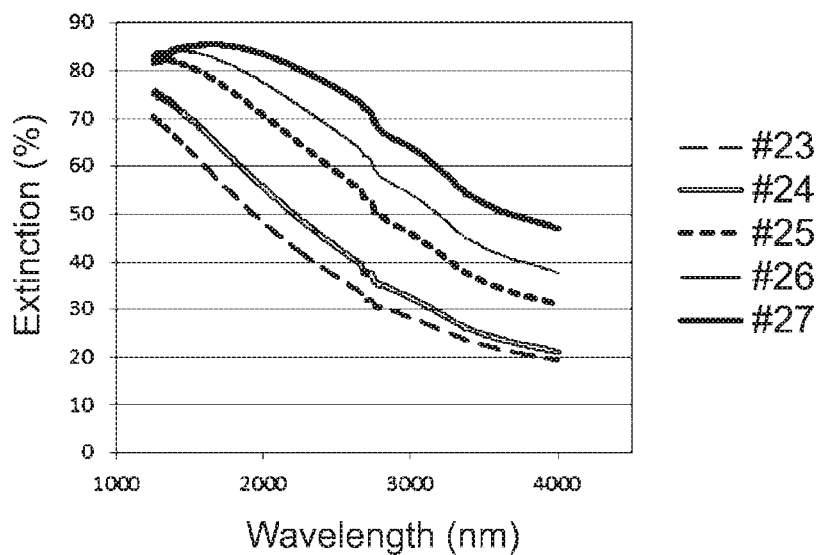

Furthermore, the dependency of the absorption spectrum with respect to the thickness of the dielectric embedding layer 206 was also investigated. Samples with various thickness of PMMA for the dielectric embedding layer 206, or Samples 14-18 (with silver conductive thin film 204; FIG. 15) and Samples 19-23 (with gold conductive thin film 204; FIG. 16) were examined. FIGS. 15A and 16A indicates absorption spectra by UV/VIS measurement, FIGS. 15B and 16B indicates extinction spectra by FT-IR measurement. In both of two series of Samples 14-18 and Samples 19-23, when the thickness of the PMMA serving as the dielectric embedding layer 206 was increased, the absorption dip in the visible region was shifted to the longer wavelength side. This behavior is similar to that of a Fabry-Perot filter of an MIM structure having a gap layer, where the gap is filled with a dielectric embedding layer 206; thus it has been shown that it is possible to adjust the wavelength dependency of the absorption with high reproducibility by the film thickness of the dielectric embedding layer 206.

Figure 17A:
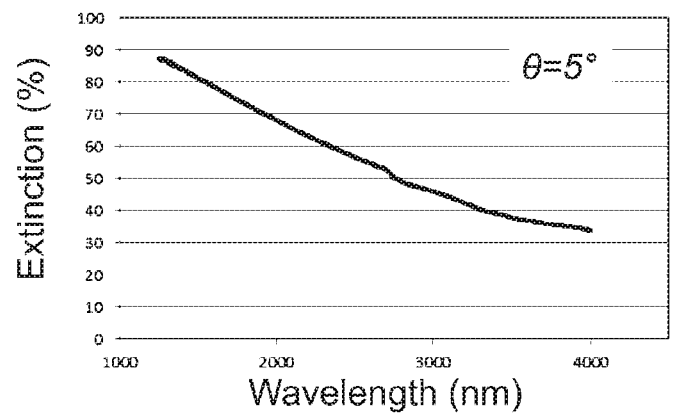
FIG. 17 includes graphs of the absorption spectrum of the light absorber sample in an example of an embodiment of the present invention for cases with the incident angles θ of 5°, 30°, and 70° (FIGS. 17A-17C, respectively).
Figure 17B:
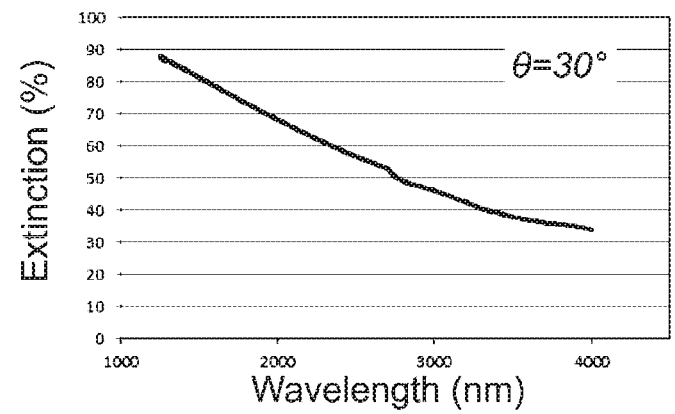
Figure 17C:
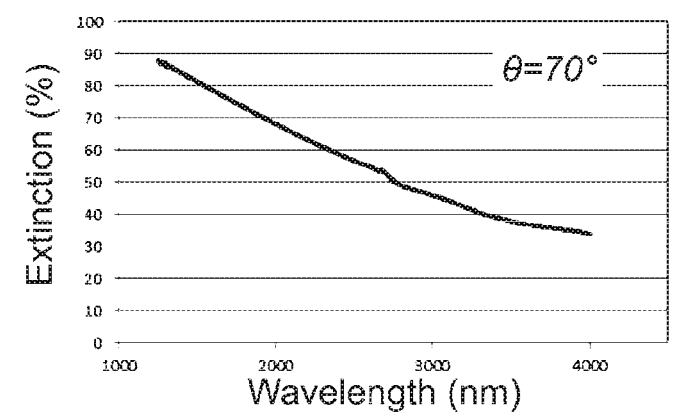

Furthermore, the absorption behavior with respect to the inclination angle (incident angle) was measured by the extinction with the FT-IR. FIG. 17 includes graphs of the extinction spectrum measured by a fabricated sample (Sample 20), and FIG. 17A-C indicate cases with the incident angles $\theta$ of 5°, 30°, and 70° respectively. Although each spectrum is shown in a separate graph, a substantial difference in its value cannot be found, as if the curves matches with one another on the drawing. In this way, it has been confirmed that a substantial angle dependency was not observed in the absorption. Moreover, the dependency of the azimuth direction around the normal direction was also examined for the light absorber samples obtained in this embodiment, only to find that they were omnidirectional (not shown). From these, it has been confirmed that the light absorber sample of the present embodiment did not show any dependency on the incident angle.

Next, dependency on the kind of metal used as the conductive thin film was examined. FIG. 18 includes graphs of the results, or absorption spectrum (FIG. 18A) and an extinction spectrum (FIG. 18B) for the light absorber sample where gold, aluminum, and silver were adopted for the conductive thin film 204 and conductive thick film 208 (Samples 28, 29, and 30 respectively), and thicknesses of the conductive thin film 204 and the dielectric embedding layer 206 were optimized. The incident angle θ of the measurement was fixed at 8°. As shown in FIG. 18, it has been confirmed in examples of an embodiment of the present invention, that absorption was realized in a wide bandwidth similarly for a conductive thin film of three kinds of metal materials. This suggests that broadband absorption can be realized regardless of the type of the conductive thin film in the present embodiment. However, at a frequency higher than the plasma frequency exhibited by the conductive thin film, the surface plasmons are not excited and absorption cannot be expected accordingly.

Lastly, observation for confirming the actual cross section of the MIM structure is described. FIG. 19 includes a SEM image capturing a cross section of Sample 28, where $SiO_2$ spherical particles with a diameter of 50 nm was adopted for the dielectric particles 202, Au was adopted for the conductive thin film 204 and a conductive thick film 208, the thickness of the conductive thin film 204 was set to 12.2 nm, and the thickness of the dielectric buried layer 206 was 124.5 nm. From distributed metal composition, which gives bright area in the SEM image, it was confirmed for Sample 28 that the conductive thin film 204 of Au covered the top portion of the dielectric particles 202 and the region of the recess portion 202R, which corresponds where there was no dielectric particles 202 on the surface 222A. However, among the surfaces of the dielectric particles 202, Au was not disposed onto a portion other than the top portion. From these, the structure of Sample 28 was similar to that of light absorber 200a in FIG. 7B, rather than that of the light absorber 200 in FIG. 7A.

As described above, according to the samples in the examples, it has been confirmed that the light absorber of the present embodiment exhibits a high absorption, the absorption wavelength range can be designed, and the absorption characteristic does not show incident angle dependency.

5. Variations

In the present embodiment, the performance of the light absorber is further enhanced by various modifications, it is possible to achieve a more preferable characteristic according to the application.

5-1. Increased Density of Dielectric Protrusions in Random Arrangement

When the dielectric protrusions are formed at high density in the present embodiment, modification may be necessary due to the randomness introduced into the arrangement of the dielectric protrusions. Specifically, when the dielectric protrusions are formed at high density in the light absorber practiced in the present embodiment, a conductive thin film may not be formed on the dielectric surface where there is no protrusions. For this reason, when the density of the dielectric protrusions is high, the aspect of the light absorber according to the present invention may be practiced by a light absorber including: a group of dielectric protrusions protruding from the surface of the dielectric at a random position along a certain dielectric surface; a conductive thin film disposed on or above at least a part of the surface of each of the dielectric protrusions included in the group; and a conductive thick film separated from the conductive thin film and extending along the dielectric surface. Similarly, the light absorber of the present embodiment may be practiced by a method for manufacturing a light absorber including steps of: forming a group of dielectric protrusions protruding from the dielectric surface at random positions along a certain dielectric surface; disposing a conductive thin film on or above at least a part of the surface of each of the dielectric protrusions included in the group; and forming a conductive thick film which is separated from the conductive thin film and extends along the dielectric.

5-2. Composite Light Absorber

While the MIM structure has been described in the present embodiment, it is possible to form a light absorber even in a MIMIM structure, that is, a structure having three conductive layers. One or more conductive thin films having unevenness due to the influence of the dielectric protrusions are adopted, and one layer of the conductive thick film is adopted. For example, a central conductive layer may be a conductive thick film, and each of the conductive layers on both sides of the conductive thin film may be a conductive thin film having unevenness due to the influence of the dielectric protrusions. The light absorber having such a structure may have a desired absorption band on both sides. In this case, the absorption characteristics of each surface may be the same or different. Thereby, it is also possible to introduce flexibility into the structure, such as, in which heat rays are absorbed on one surface, the thermal energy is radiated from another side with a different wavelength. In addition, when one of the conductive layers on both sides in the MIMIM structure and the central conductive layer a conductive thin film exhibit unevenness, and the remaining conductive layer is a conductive thick film, a high degree of freedom in designing can be obtained compared with the case when absorption occurs only on one side, the capability of further widening the absorption band and increasing the absorption ratio can be expected.

5-3. Heat Ray Shielding Glass

In addition, the present embodiment can be applied to a window of the building material by reducing the absorption in the wavelength region of visible light (for example, wavelength of 400 nm-800 nm) and the performance improvement is expected by employing the light absorber of the present embodiment. The disclosure of the above embodiments can be applied to design for realizing a practical transmittance at visible range and a large absorption ratio in a wavelength range of 800 nm to 2500 nm (near-infrared). For this purpose, an oxide semiconductor is used for both the conductive thin film and the conductive thick film, and the absorption in the visible region of all the materials located between them is also suppressed. The conductive thick film is made to have a thickness that would allow transmission over an infrared range (800 nm-2500 nm), for which the absorption ratio is improved, and while the absorption ratio in the band is measured, the thickness and material of the conductive thin film, the density of the dielectric protrusions, shapes, density and particle size of the dielectric particles, and the optical distance between the conductive thin film and the conductive thick film are adjusted. This allows us to manufacture glass building material having desired heat ray preventing characteristics.

5-4. Radiative Cooling Film

If the adjustment capability of the absorption for each wavelength range of this embodiment is utilized, it is possible to design a film ("radiative cooling film") exhibiting a high absorption in the atmospheric window of a wavelength of 8 to 13 μm, and a high transmittance in a wavelength of 0.3 μm to 2.5 μm in a solar spectrum region. The radiative cooling film employs, for example, a polymer film for a dielectric film, and adopts an oxide semiconductor for the conductive thin film and the conductive thick film. The emissivity and the absorptance are equal from the Kirchhoff's law, the radiative cooling film radiates heat as infrared light into the outer space and realizes the effect of cooling. The radiative cooling film can be employed in any application in which radiative cooling is useful. For example, a radiative cooling film stuck to the surface of a solar cell contributes to cooling the solar cell. Since the photoelectric conversion efficiency increases as the temperature decreases in a silicon solar cell, improvement of power generation efficiency can be expected by applying the radiative cooling film. In addition, other forms similar to the radiative cooling film may be combined with reflection. To provide an application requiring only cooling, high transmittance, such as when used in a solar cell, is not always necessary for optical characteristics in the visible region. For example, when the reflectance is close to 100% in the visible region while achieving a high absorptance in the above-described window region of the atmosphere, a radiative cooling mirror having both radiative cooling and reflection can be manufactured. For a conductive thin film and a conductive thick film for such applications preferable material should have little absorption in a solar spectrum region such as silver or aluminum.

The embodiments of the present disclosure have been concretely described above. Each of the above-described embodiments, variations and specific examples has been described for the purpose of explaining the disclosure; therefore, the scope of the disclosure of the present application should be determined based on the claims. Also, modifications within the scope of the present disclosure including other combinations of the respective embodiments are also included in the scope of the claims.

INDUSTRIAL APPLICABILITY

The light absorber of the present invention can be used in any apparatus utilizing absorption of light.

REFERENCE SIGNS LIST 100, 200, 200a, 300, 400 light absorber
102, 302 dielectric protrusions
202, 402 dielectric particles
202A top surface
202B side surface
102R, 202R recess portion
104, 204, 304, 404 conductive thin film
106, 206 dielectric embedding layer
108, 208, 308, 408 conductive thick film
312, 412 dielectric film
312A, 412A one side
312B, 412B the other side
122, 222 glass substrate
122A, 222A one surface (dielectric surface)

The invention claimed is:

1. A light absorber, comprising:
a substrate having a dielectric surface;
a group of dielectric protrusions, each dielectric protrusion protruding from the dielectric surface of the substrate at a random position on the dielectric surface of the substrate;
a conductive thin film disposed on or above at least a part of a surface of each dielectric protrusion in the group of dielectric protrusions and also disposed directly, or indirectly via another layer, on at least a part of the dielectric surface of the substrate at a location where the dielectric protrusions are not present thereon; and
a conductive thick film spreading out along the dielectric surface of the substrate and being kept separate from the conductive thin film, the conductive thick film spreading out to a range including where the group of the dielectric protrusions are present and also where the dielectric protrusions are not present thereon,
wherein an optical distance between the conductive thin film and the conductive thick film is selected in accordance with a wavelength range to be absorbed by the light absorber.

2. The light absorber according to claim 1, wherein
the group of the dielectric protrusions is formed by disposing each dielectric particle in an in-plane random arrangement and in contact with the dielectric surface of the substrate, and
the conductive thin film is formed on or above at least a part of a region on the surface of each dielectric particle and is formed directly or via another layer on at least a part of the dielectric surface of the substrate where the dielectric particles are not present thereon, the region being on a side of each dielectric particle, the side facing the other side of the substrate side as viewed from each dielectric particle.

3. The light absorber according to claim 1, further comprising:
a dielectric embedding layer spreading out along the dielectric surface of the substrate and covering the conductive thin film,
wherein the conductive thick film is formed on or above a surface of the other surface side of the conductive thin film side as viewed from the dielectric embedding layer, and
wherein the optical distance is adjusted based at least in part on a thickness of the dielectric embedding layer.

4. The light absorber according to claim 1,
wherein the substrate is a dielectric film having a thickness between a first surface and the other surface, the first surface being the dielectric surface of the substrate, and wherein
the group of the dielectric protrusions is located on the first surface side of the dielectric film,
the conductive thin film is disposed on or above each of the dielectric protrusions, and
the conductive thick film is disposed on the other surface side of the dielectric film.

5. The light absorber according to claim 4, wherein the optical distance is adjusted based at least in part by the thickness of the dielectric film.

6. The light absorber according to claim 1, wherein the conductive thin film contains a material selected from a group consisting of gold, silver, aluminum, an oxide semiconductor, and an organic conductor.

7. The light absorber according to claim 6, wherein the conductive thin film contains silver and has a thickness of 10 nm or more and 50 nm or less.

8. The light absorber according to claim 1, wherein the conductive thick film contains a material selected from a group consisting of gold, silver, aluminum, an oxide semiconductor, and an organic conductor.

9. The light absorber according to claim 1, wherein, among the conducting thick film and the conducting thin film, the conductive thin film is positioned on an incident side for a light wave to be absorbed.

10. A bolometer adopting the light absorber as recited in claim 1.

11. An infrared absorber adopting the light absorber as recited in claim 1.

12. A solar thermal power generating device adopting the light absorber as recited in claim 1.

13. A radiative cooling film adopting the light absorber as recited in claim 1.

14. A method for manufacturing a light absorber, comprising the steps of:
- forming a group of dielectric protrusions, each of which protruding from a dielectric surface of a substrate at a random position on the dielectric surface of the substrate;
- disposing a conductive thin film such that the conductive thin film is disposed on or above at least a part of a surface of each dielectric protrusion in the group of dielectric protrusions and is disposed directly or indirectly via another layer on at least a part of the dielectric surface of the substrate in a location where the dielectric protrusions are not present thereon; and
- forming a conductive thick film that spreads out along the dielectric surface of the substrate to a range including where the group of the dielectric protrusions are present and where the dielectric protrusions are not present thereon, and is kept separate from the conductive thin film,
- wherein an optical distance between the conductive thin film and the conductive thick film is selected in accordance with a wavelength range to be absorbed by the light absorber.

15. The method for manufacturing a light absorber according to claim 14,
- wherein the step of forming the group of the dielectric protrusions includes a step of disposing each dielectric particle in an in-plane random arrangement and in contact with the dielectric surface of the substrate, and
- wherein the step of disposing the conductive thin film is a step of disposing the conductive thin film on or above at least a part of a region on a surface of each dielectric particle and disposing the conductive thin film directly or indirectly via another layer on at least a part of the dielectric surface of the substrate at locations where the dielectric particles are not present thereon, the region being on a side of each dielectric particle, the side facing the other side of the dielectric surface side of the substrate as viewed from each dielectric particle.

16. A method for manufacturing a light absorber comprising:
- forming a group of dielectric protrusions, each of which protruding from a dielectric surface at a random position on the dielectric surface;
- disposing a conductive thin film on or above at least a part of a surface of each dielectric protrusion in the group and on or above at least a part of the dielectric surface at a location where the dielectric protrusions are not present; and
- forming a conductive thick film that spreads out along the dielectric surface and is kept separate from the conductive thin film,
- wherein the step of forming the group of the dielectric protrusions includes a step of disposing each dielectric particle in an in-plane random arrangement and in contact with the dielectric surface, and wherein the step of forming the group of the dielectric protrusions also includes a step of fixing the dielectric particles to the dielectric surface in the in-plane random arrangement by bringing a dispersion liquid of the dielectric particles into contact with the dielectric surface.

17. The method for manufacturing a light absorber according to claim 16,
- wherein the dispersion liquid of the dielectric particles is selected to have a concentration higher than that required for obtaining a reference value in the absorption coefficient or the extinction coefficient.

* * * * *